(12) United States Patent
Covic et al.

(10) Patent No.: US 10,158,250 B2
(45) Date of Patent: Dec. 18, 2018

(54) EFFICIENCY NON-SELF TUNING WIRELESS POWER TRANSFER SYSTEMS

(71) Applicant: Auckland UniServices Limited, Auckland (NZ)

(72) Inventors: Grant Anthony Covic, Mt. Albert (NZ); Chang-Yu Huang, Takapuna (NZ)

(73) Assignee: Auckland UniServices Limited, Auckland (NZ)

( * ) Notice: Subject to any disclaimer, the term of this patent is extended or adjusted under 35 U.S.C. 154(b) by 364 days.

(21) Appl. No.: 14/424,390

(22) PCT Filed: Sep. 2, 2013

(86) PCT No.: PCT/NZ2013/000154
§ 371 (c)(1),
(2) Date: Feb. 26, 2015

(87) PCT Pub. No.: WO2014/035263
PCT Pub. Date: Mar. 6, 2014

(65) Prior Publication Data
US 2015/0200548 A1      Jul. 16, 2015

(30) Foreign Application Priority Data

Aug. 31, 2012  (NZ) ......................................... 602184
Sep. 14, 2012  (NZ) ......................................... 602453

(51) Int. Cl.
*H01F 27/42*  (2006.01)
*H02J 50/12*  (2016.01)
*H02J 5/00*   (2016.01)

(52) U.S. Cl.
CPC .............. *H02J 50/12* (2016.02); *H02J 5/005* (2013.01)

(58) Field of Classification Search
CPC .................................. H02J 5/005; H02J 7/025
(Continued)

(56) References Cited

U.S. PATENT DOCUMENTS

| 5,293,308 A | 3/1994 | Boys et al. |
| 5,898,579 A | 4/1999 | Boys et al. |

(Continued)

FOREIGN PATENT DOCUMENTS

| WO | WO-2010/090539 A1 | 8/2010 |
| WO | WO-2011/016737 A1 | 2/2011 |
| WO | WO-2014/035263 | 3/2014 |

OTHER PUBLICATIONS

"European Application No. 13833528.6, Extended European Search Report dated Mar. 8, 2016", (dated Mar. 8, 2016), 8 pgs.

(Continued)

*Primary Examiner* — Thomas Skibinski
(74) *Attorney, Agent, or Firm* — Schwegman Lundberg & Woessner, P.A.

(57) ABSTRACT

A primary resonant network for a wireless power transfer has a primary winding capable of being energized to provide a magnetic field, and a reactive component selected to constrain the reactive loading on a power supply which energizes the primary resonant network. The reactive component is selected dependent on a given variation in inductance or capacitance of the primary resonant network and a given variation in inductance or capacitance of a secondary resonant network coupled to the primary resonant network.

19 Claims, 22 Drawing Sheets

(58) Field of Classification Search
USPC .......... 307/104, 9.1, 10.1; 320/108; 363/23, 363/133
See application file for complete search history.

(56) References Cited

U.S. PATENT DOCUMENTS

2009/0243397 A1    10/2009  Cook et al.
2011/0299313 A1*   12/2011  Hussmann .......... H02M 3/3374
                                                363/133

OTHER PUBLICATIONS

"International Application No. PCT/NZ2013/000154, International Search Report and Written Opinion dated Nov. 25, 2013", (dated Nov. 25, 2013), 10 pgs.

* cited by examiner (a)

(b)

Pick-up reflected equivalent inductance $L_r$ versus $\delta x$ (mm) at (a) z = 100mm and (b) z = 150mm (c)

(d)

The ratio of LCL input reactance over resistance vs. $\delta x$ (mm) at (c) z = 100mm and (d) z = 150mm (e)

(f)

The primary LCL network input DPF versus $\delta x$ (mm) at (e) z = 100mm (f) z = 150mm ―――― SPICE    ― ― ― Analytical The primary LCL network input DPF versus δx (mm) at (g) z = 100mm (h) z = 150mm
——— AA ········· BB — — — New tuning design The primary LCL network input DPF versus δx (mm) at (e) z = 100mm (f) z = 150mm
— SPICE  — — — Analytical

Primary network natural resonant frequency

Secondary network natural resonant frequency

EFFICIENCY NON-SELF TUNING WIRELESS POWER TRANSFER SYSTEMS

PRIORITY CLAIM TO RELATED APPLICATIONS

This application is a U.S. national stage application filed under 35 U.S.C. § 371 from International Application Serial No. PCT/NZ2013/000154, which was filed Sep. 2, 2013, and published as WO 2014/035263 on Mar. 6, 2014, and which claims priority to New Zealand Application No. 602184, filed Aug. 31, 2012, and to New Zealand Application No. 602453, filed Sep. 14, 2012, which applications and publication are incorporated by reference as if reproduced herein and made a part hereof in their entirety, and the benefit of priority of each of which is claimed herein.

This invention relates to wireless power transfer systems, also known as inductive power transfer (IPT) systems.

BACKGROUND TO THE INVENTION

Inductive Power Transfer (IPT) systems are, well known. An example of one such system is shown generally in FIG. 1. Such systems are also described comprehensively in the prior art, including for example U.S. Pat. No. 5,293,308.

In recent times IPT systems have been used in electric vehicle battery charging applications. A significant advantage of IPT for electric vehicle battery charging is its tolerance to misalignment between the primary magnetic structure and the magnetic structure of the secondary (also referred to in this document as a pick-up) apparatus. As shown in FIG. 1, an IPT charger typically includes a switching power supply such as a resonant converter which is supplied from a utility grid and in turn provides an alternating current to a primary inductor which may comprise a track or a magnetic structure in the form of a pad for example. The varying magnetic field which is provided by the primary pad is then intercepted by one or more secondary magnetic structures which usually comprise a further pad or coil, represented in FIG. 1 by inductance L2. The power received is conditioned by a resonant network and power controller in the pick-up apparatus and then supplied to the electrical load, for example a battery, being charged.

Physical movement or displacement between the ferrimagnetic material and coils in the pick-up (L2) relative to the primary pad (L1) necessarily introduces variations in the magnetic coupling between the pads and also introduces variations in the pad self inductance. Also, variations in the tuning generally in IPT systems can change dependent on other factors, for example component tolerances and variations over time (e.g. tuning capacitor degradation), breakage of ferrite in magnetic structures, etc. Therefore, it is impossible for both the primary and secondary charging pads to always be accurately tuned over given range of movement within a specified power transfer zone without adopting self-tuning circuitry. In a fixed frequency primary side current controlled system, this places additional reactive load on the power supply, although it does not affect the power transfer capability of the pick-up providing the track current can be regulated at a desired magnitude. However, the mistuned resonant network introduces additional reactive load in the system and this reactive load increases the losses in the system in general, including the power supply, additional switch conduction loss and losses in the magnetic coupling structures. Therefore, creating systems in which the reactive load due to mistuning is minimised is advantageous.

OBJECT

It is an object of the present invention to provide IPT systems and apparatus and methods of IPT system and apparatus design which will at least go some way toward overcoming one or more disadvantages of the prior art, or which will at least provide a useful alternative.

SUMMARY OF THE INVENTION

Accordingly in one aspect the invention broadly consists in a wireless power transfer primary network and/or secondary in which one or more components are selected dependent on the due to variation in the tuning of the primary and/or secondary resonant networks and/or variation coupling between the primary network and secondary networks.

In one embodiment the one or more components are selected to minimise reactive loading seen by the primary power supply.

In another embodiment the one or more components are selected to minimise the displacement power factor seen by the primary power supply.

In another embodiment the one or more components are selected to minimise the current in the secondary primary network. Preferably the load seen by the primary power supply is inductive over a nominal load range.

In another aspect the invention broadly provides a wireless power transfer primary resonant network including:
a primary winding capable of being energised to provide a magnetic field;
at least one reactive tuning component selected to constrain the reactive loading on a power supply which energises the primary resonant network, the reactive tuning component being selected dependent on a given variation in inductance or capacitance of the primary resonant network and a given variation in inductance or capacitance of a secondary resonant network coupled to the primary resonant network.

The reactive tuning component may be selected dependent on a given variation in coupling between the primary and secondary resonant networks.

The reactive tuning component may be selected to constrain the variation in reactive loading on the power supply.

The reactive tuning component may be selected to constrain the power factor.

In one embodiment the tuning component comprises the primary winding.

The given variation in inductance or capacitance may be caused by relative movement or displacement of a pick-up winding of the secondary resonant network relative to the primary winding.

The given variation in coupling may be caused by relative movement or displacement of a pick-up winding of the secondary resonant network relative to the primary winding.

In another aspect the invention broadly provides a wireless power transfer secondary resonant network including:
a pick-up winding capable of receiving energy from a varying magnetic field produced by a primary resonant network;
at least one reactive tuning component selected to constrain the reactive loading on a power supply which energises the primary resonant network, the reactive tuning component being selected dependent on a given variation in inductance or capacitance of the secondary resonant network and a given variation in inductance or capacitance of the primary resonant network to which the secondary resonant network is coupled.

The reactive tuning component may be selected dependent on a given variation in coupling between the primary and secondary resonant networks.

The reactive tuning component may also be selected to constrain the variation in reactive loading on the power supply.

The reactive tuning component may be selected to constrain the power factor.

The tuning component may comprise the pick-up winding.

In one embodiment the given variation in inductance or capacitance is caused by relative movement of the pick-up winding relative to a primary winding of the primary resonant network.

In one embodiment the given variation in coupling is caused by relative movement or displacement of the pick-up winding the pick-up winding relative to a primary winding of the primary resonant network.

In another aspect the invention broadly provides apparatus for wireless power transfer including:
a primary resonant network,
a secondary resonant network coupled to the primary resonant network,
wherein the wireless power transfer system has a system operating frequency and one or both of the primary resonant network and the secondary resonant network have a natural resonant operating frequency that is different from the system operating frequency, and
wherein the natural resonant operating frequency of the primary resonant network is selected dependent on a given variation in inductance or capacitance of the primary resonant network and a given variation in inductance or capacitance of the secondary resonant network.

In one embodiment the natural resonant operating frequency of the primary resonant network is selected dependent on a given variation in coupling between the primary and secondary resonant networks.

In one embodiment the natural resonant operating frequency of the primary resonant network is selected to constrain a variation in the operating frequency of the primary resonant network.

In another aspect the invention broadly consists in a method of designing a wireless power transfer primary network and/or power supply and/or pick-up comprising selecting one or more components dependent on the variation in the tuning of the primary and/or secondary resonant networks and variation in coupling between the primary network and the secondary network.

In one embodiment the one or more components are selected to minimise reactive loading on the power supply.

In another embodiment the one or more components are selected to minimise the displacement power factor seen by the primary power supply.

In another embodiment the one or more components are selected to minimise the current in the primary network. Preferably the load seen by the primary power supply is inductive over a nominal load range.

In another embodiment the one or more components are selected to minimise the current in the secondary. Preferably the load seen by the primary power supply inverter is inductive over a nominal load range.

In another aspect the invention broadly provides a wireless power transfer primary resonant network wherein the nominal inductance of the network is selected such that the change in the total reactive load of the network is minimised within a defined range of relative movement between a magnetic structure of the primary and a magnetic structure of a pick-up device.

In one embodiment the nominal inductance is selected such that the input impedance to the network is not capacitive.

In one embodiment the nominal inductance is selected such that the input impedance to the network is inductive. Preferably the input impedance is maintained inductive over the operating parameters of the system.

In another aspect the invention broadly provides a wireless power transfer pick-up wherein the nominal inductance of the pick-up is selected such that the change in the total reactive load of a primary resonant network from which the pick-up receives power in use is minimised within a defined range of relative movement between a magnetic structure of the primary network and a magnetic structure of a pick-up device.

In another aspect the invention provides apparatus for wireless power transfer wherein the nominal inductance of the primary resonant network and the nominal inductance of a pick-up are selected such that the change in the total reactive load of a primary resonant network from which the pick-up receives power in use is minimised within a defined range of relative movement between a magnetic structure of the primary network and a magnetic structure of the pick-up.

In another aspect the invention provides a method of designing a wireless power primary resonant network comprising selecting the nominal inductance of the network such that the change in the total reactive load of the network is minimised within a defined range of relative movement between a magnetic structure of the primary and a magnetic structure of a pick-up device.

In yet another aspect the invention provides a method of designing a wireless power transfer pick-up comprising selecting the nominal inductance of the pick-up such that the change in the total reactive load of a primary resonant network from which the pick-up receives power in use is minimised within a defined range of relative movement between a magnetic structure of the primary network and a magnetic structure of a pick-up device.

In yet another aspect the invention provides a method of designing wireless power transfer apparatus comprising the steps of selecting the nominal inductance of the primary resonant network and the nominal inductance of a pick-up such that the change in the total reactive load of a primary resonant network from which the pick-up receives power in use is minimised within a defined range of relative movement between a magnetic structure of the primary network and a magnetic structure of the pick-up.

The variations in coupling may be variations in reactive load that appear to be inductive or capacitive.

The mistuning or variations in tuning may be mistuning or variations in reactive load that appear to be inductive or capacitive.

The variations in coupling may occur due to one or more of:
Changes in physical position of one or more pick-up devices relative to a track or a lumped primary structure;
Use of different pick-up magnetic structures;
Changes in the componentry or magnetics, such as damaged ferrite.

The mistuning or variations in tuning may occur due to one or more of:
Component tolerances;
Manufacturing tolerances;
Component degradation or other changes.

In a further aspect the invention broadly consists in any novel feature, or method step, or any novel combination of features or method steps disclosed herein.

Further aspects of the invention, which should be considered in all its novel aspects, will become apparent from the following description.

DRAWING DESCRIPTION

One or more embodiments will be described further below with reference to the accompanying drawings, in which:

DRAWING DESCRIPTION

FIGS. 11a and 11b show measured bi-filar pad inductance with its magnetically coupled pad open circuited and short circuited for variations in x (millimeters) at (a) z=100 millimeters and (b) z=150 millimeters.

FIGS. 11c and d show measured single wire pad inductances with magnetically coupled pad open circuited for variations in x (millimeters) at (c) z=100 millimeters and (d) z=150 millimeters.

FIGS. 11e and f show measured mutual inductance between a bi-filar wound pad and a single wire wound pad for variations in x (millimeters) at (e) z=150 millimeters and (f) z=150 millimeters.

Figure 12:
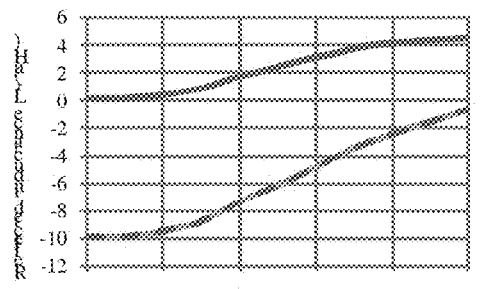
Figure 12:
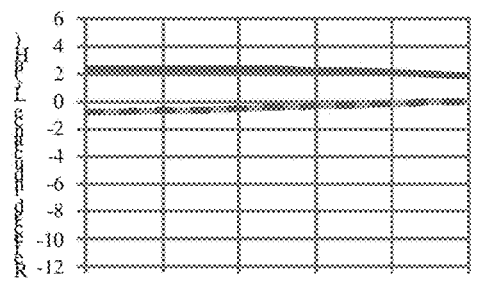
Figure 12:
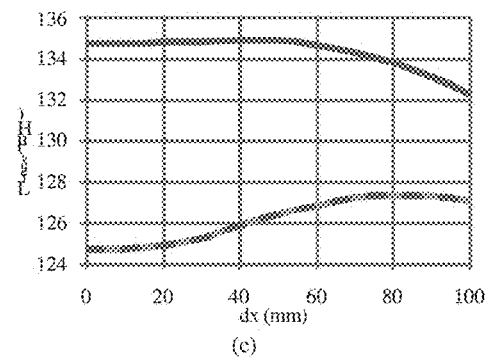
Figure 12:
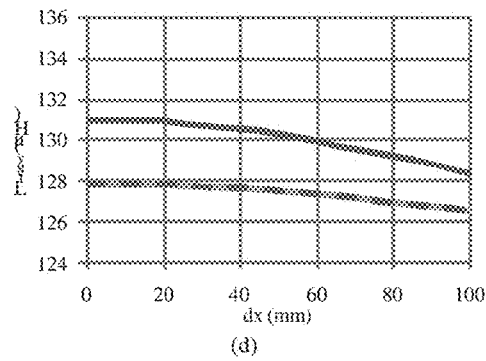
Figure 12:
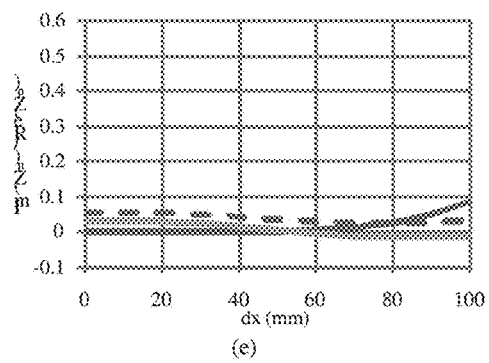
Figure 12:
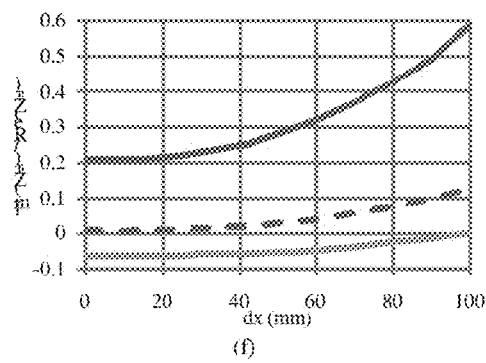
Figure 12:
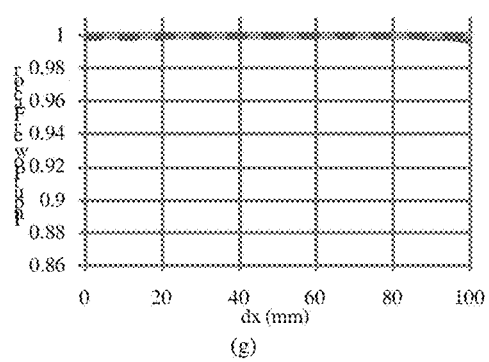
Figure 12:
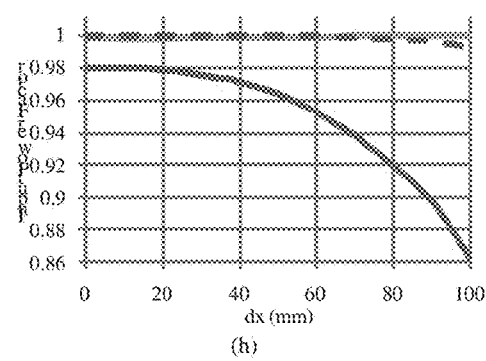

FIG. 12 shows plots representing analytical results of the primary LCL network with 700 millimeter circular pad and series tuned pick up tuned at position AA, BB and the new tuning design against changes in x at z=100 millimeters and z=150 millimeters.

FIG. 12a shows pick up reflected equivalent inductance $L_R$ versus changes in x (millimeters) at (A) z=100 millimeters and (B) z=150 millimeters.

FIG. 12b shows pick up reflected equivalent inductance $L_R$ versus changes in x (millimetres) at (a)z=100 millimeters and (b)z=150 millimetres.

FIGS. 12c and 12d show the equivalent primary inductance $L_1$ equiv for changes in x (millimeters) at (c) z=150 millimeters, and (d) z=150 millimeters.

FIGS. 12e and f show the ratio of LCL input reactants over resistance against distance x (millimeters) at (e) z=100 millimeters and (f) z=150 millimeters.

FIGS. 12g and h show the primary LCL network input displacement power factor against x (millimeters) at (g) z=100 millimeters and (h) z=150 millimeters.

Figure 13:
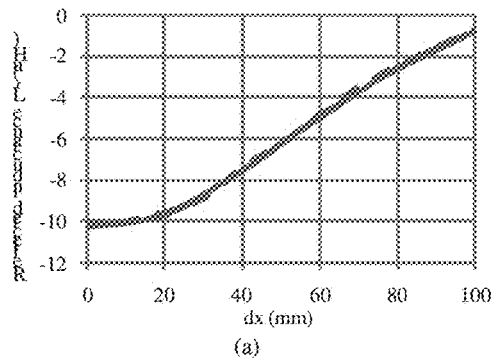
Figure 13:
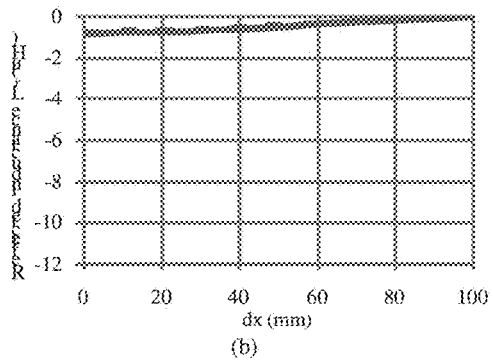
Figure 13:
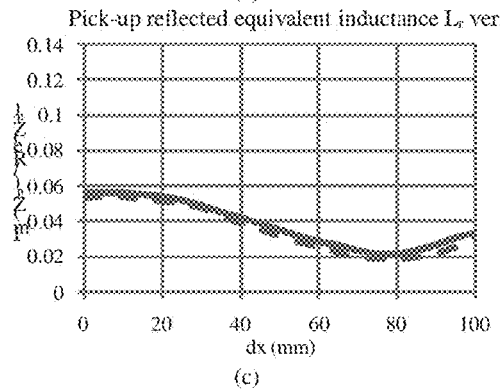
Figure 13:
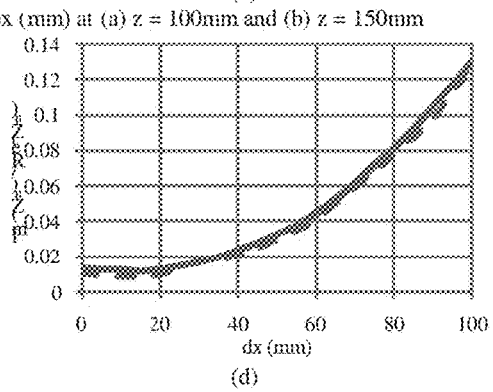
Figure 13:
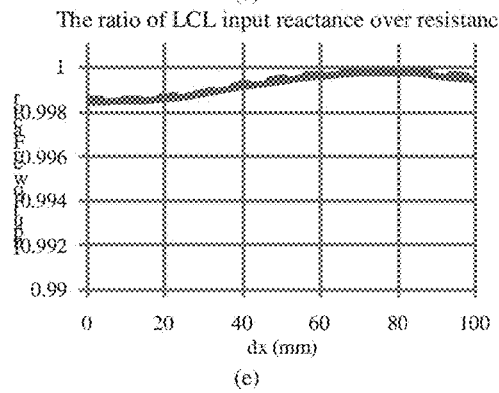
Figure 13:
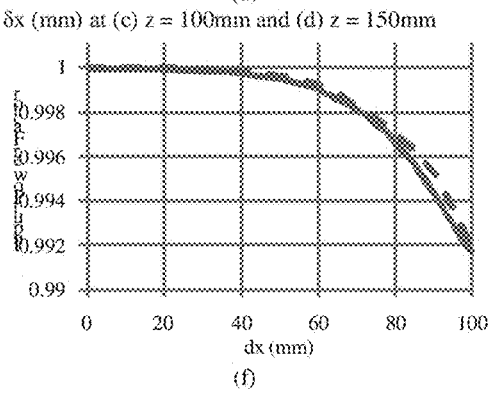

FIG. 13 shows analytical and SPICE simulation results of the primary LCL network with the 700 millimeter circular pad and series tuned pick up tuned at the new tuning values against changes in x, at z of 100 millimeters and 150 millimeters.

FIGS. 13a and 13b show pick up reflected equivalent inductance $L_R$ against x (millimeters) at (a) z=100 millimeters and (b) z=150 millimeters.

FIGS. 13c and d show the ratio of LCL input reactance over resistance against changes in x (millimeters) at (c) z=100 millimeters and (d) z=150 millimeters.

FIGS. 13e and f show the primary LCL network input displacement power factor against changes in x (millimeters) at (e) z=100 millimeters and (f) z=150 millimeters.

Figure 14:
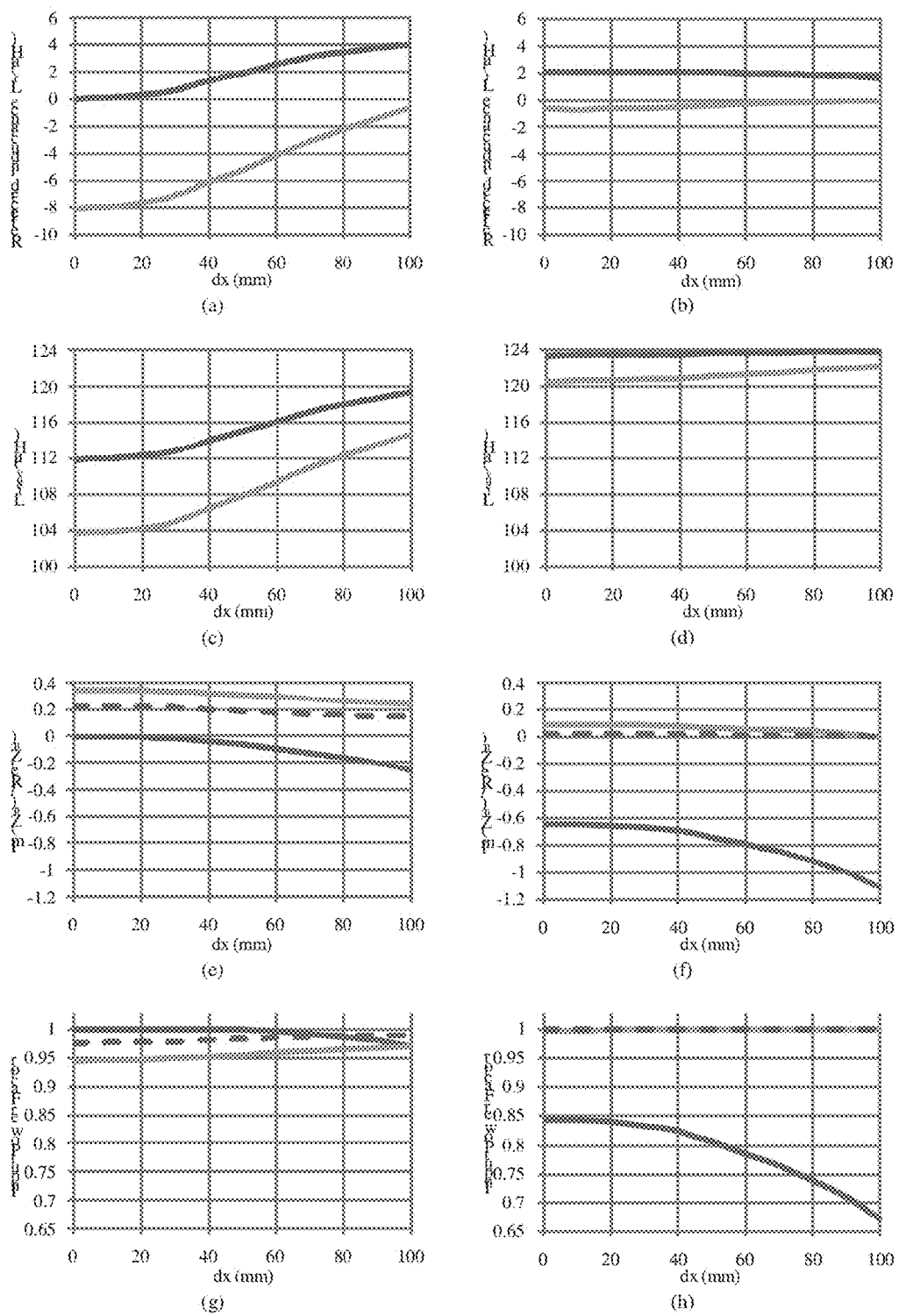

FIG. 14 shows the analytical results of the primary LCL network with 700 millimeter circular pad and parallel tuned pick up positioned at position AA, BB at the new tuning value against changes in x at z=100 millimeters and 150 millimeters.

FIG. 14a shows the pick up reflected equivalent inductance $L_R$ versus changes in x (millimeters) at (a) z=100 millimeters and (b) z=150 millimeters.

FIG. 14b shows the pick up reflected equivalent inductance $L_R$ versus changes in x (millimetres) at (a)z=100 millimeters and (b)z=150 millimetres.

FIGS. 14c and d show the equivalent primary inductance $L_1$ equiv versus changes in x (millimeters) at (c) z=100 millimeters and (d) z=150 millimeters.

FIGS. 14e and f show the ratio of LCL input reactance over resistance against changes in x (millimeters) at (e) z=100 millimeters and (f) z=150 millimeters.

FIGS. 14g and h show the primary LCL network input displacement power factor against changes in x (millimeters) at (g) 100 millimeters and (h) z=150 millimeters.

Figure 15:
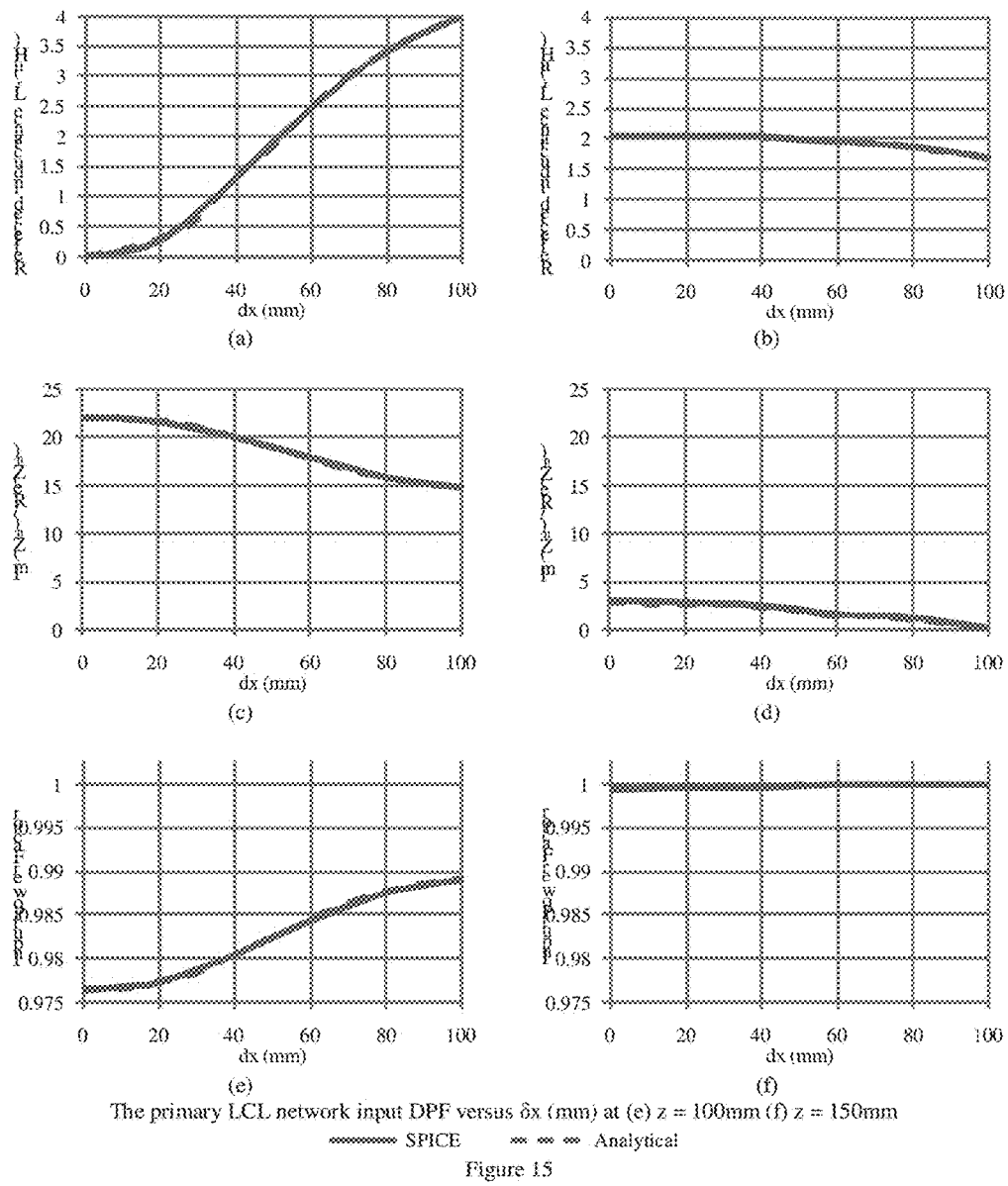

FIG. 15 shows the analytical and SPICE simulation results of the primary LCL network with 700 millimeter circular pad and parallel tuned pick up tuned at the new pick up values against x at z of 100 millimeters and 150 millimeters.

FIGS. 15a and b show the pick up reflected equivalent inductance $L_R$ against x (millimeters) at (a) z=100 millimeters and (b) z=150 millimeters.

FIGS. 15c and d show the ratio of LCL input reactance over resistance against changes in the x (millimeters) at (c) z=100 millimeters and (d) z=150 millimeters.

FIGS. 15e and f show the primary LCL network input displacement power factor against changes in x (millimeters) at (e) z=100 millimeters and (f) z=150 millimeters.

Figure 16:
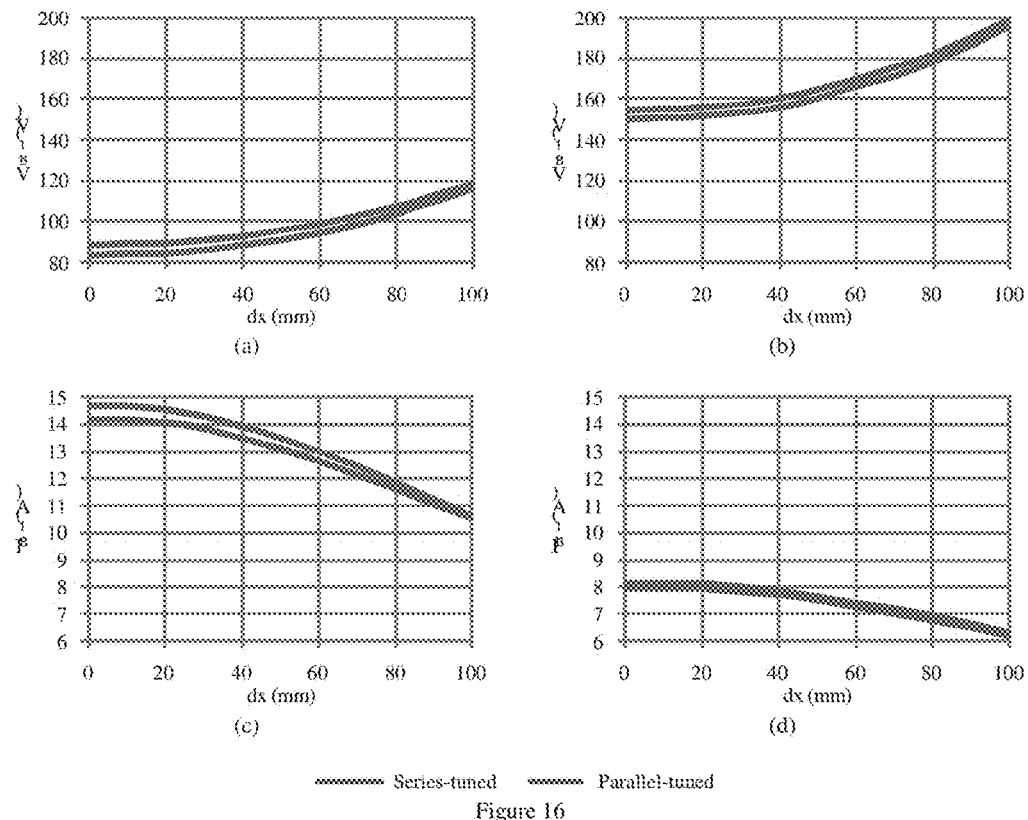

FIG. 16 shows SPICE simulation results with the fundamental component of the primary inverter bridge voltage $V_{B1}$ and current $I_{B1}$ with 700 millimeter circular pad with series tuned and parallel pick up using the developed tuning technology against changes in the x z of 100 millimeters and 150 millimeters.

FIGS. 16a and b show the fundamental component of an inverter bridge voltage against changes in x (millimeters) at (a) z=100 millimeters and (b) z=150 millimeters.

FIGS. 16c and 16d show the fundamental component of an inverter bridge current against changes in x (millimeters) at (c) z=100 millimeters and (d) z=150 millimeters.

Figure 17:
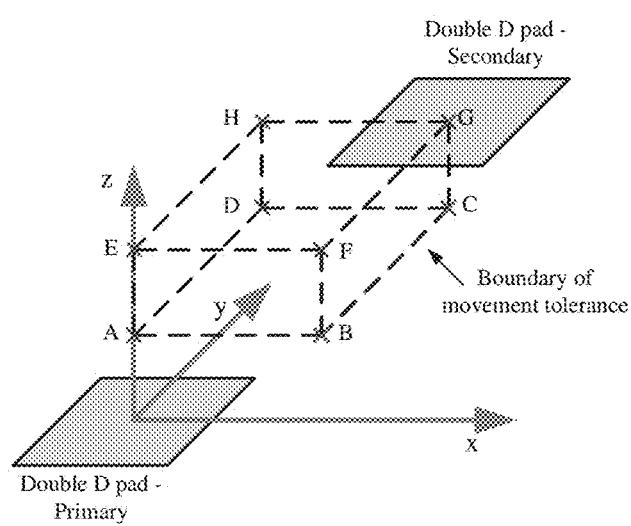

FIG. 17 is a conceptual diagram showing a constraint in movement over a coupling area which may be applied to magnetic structures of other shapes.

Figure 10:
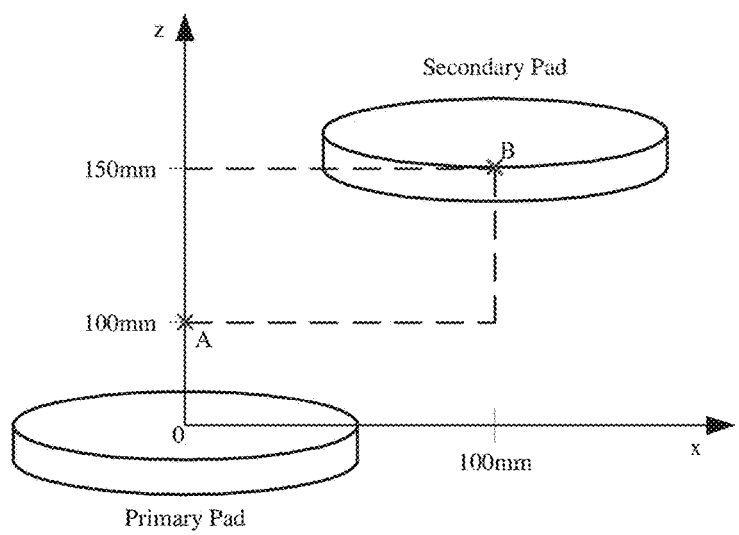
FIG. 10 is a conceptual diagram of the various positions for maximum coupling at position A and minimum coupling at position B being the given variation in relative position for a coupled primary pad and secondary pad.

FIGS. 18 to 25 generally show changes in frequency of primary and secondary coupled resonant networks for a system having an operating frequency of 20 khz for various tuning arrangements when the secondary pad is moved from a coupling position of maximum coupling (a) to minimum coupling (b) within a defined power transfer area as described with reference to FIG. 10.

Figure 18:
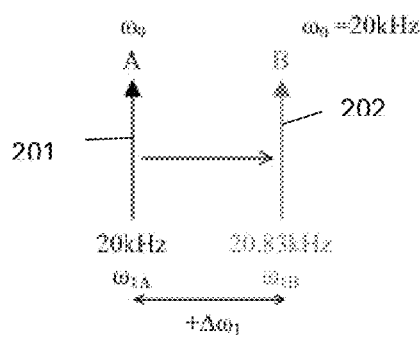
Figure 18:
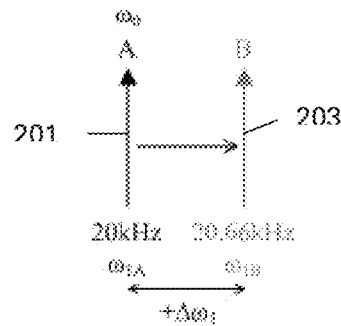
Figure 18:
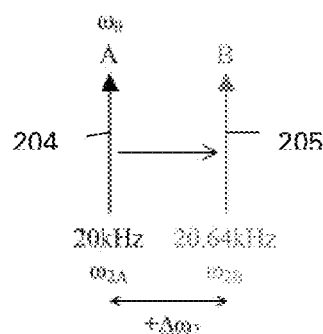

FIG. 18 relates to a series tuned pick up with the system tuned in the AA position.

Figure 19:
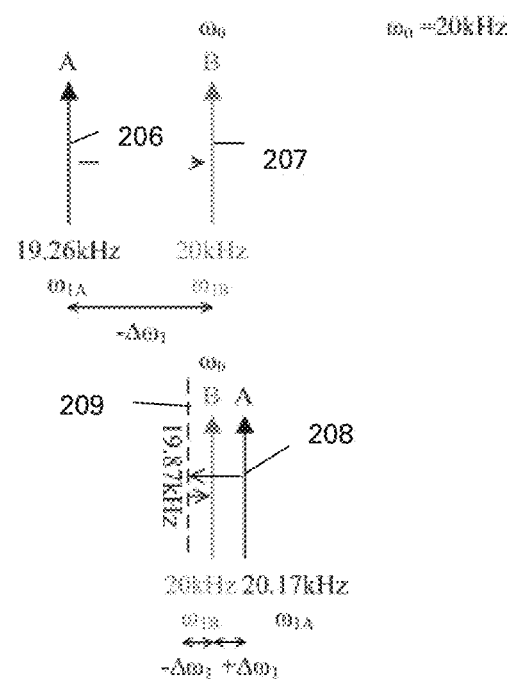
Figure 19:
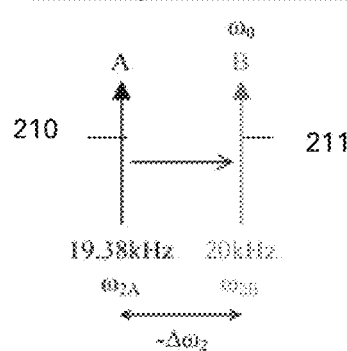

FIG. 19 relates to a series tuned LC pick up with the system tuned in the BB position.

Figure 20:
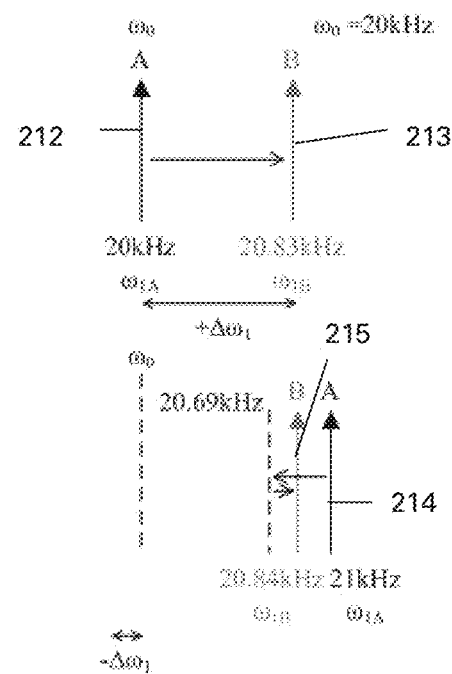
Figure 20:
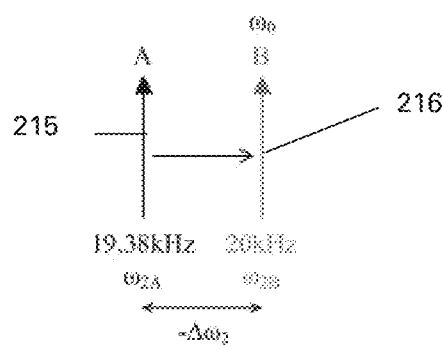

FIG. 20 relates to a series LC tuned pick up with the system tuned at AB position, the pick up tuned with B position inductance the primary tuned with A position inductance.

Figure 21:
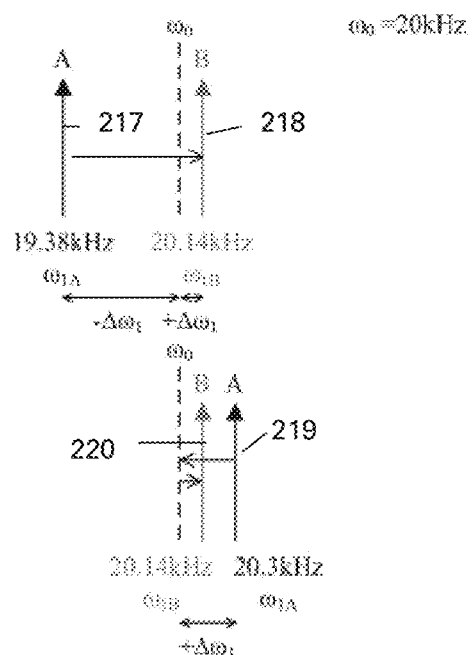
Figure 21:
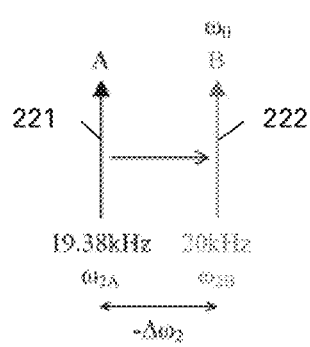

FIG. 21 relates to a series tuned LC pick up with a system tuned according to a new design.

Figure 22:
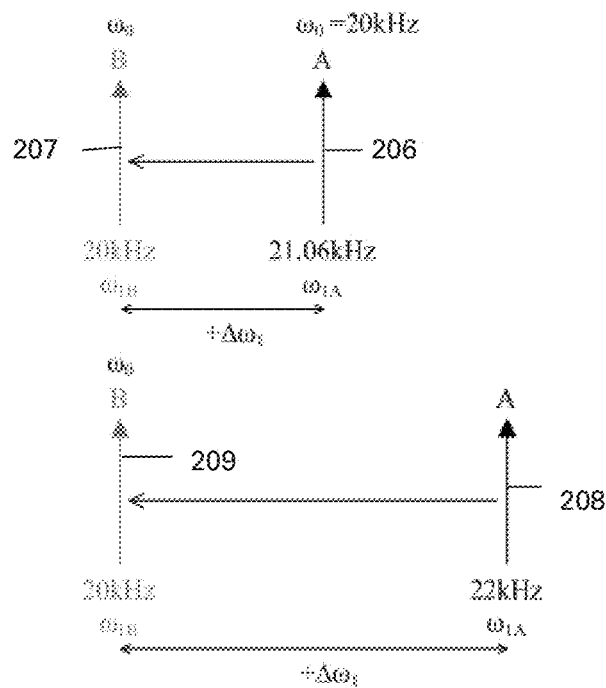
Figure 22:
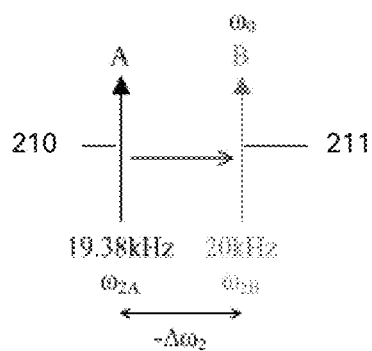

FIG. 22 relates to a parallel tuned LC pick up with a system being tuned in the BB position.

Figure 23:
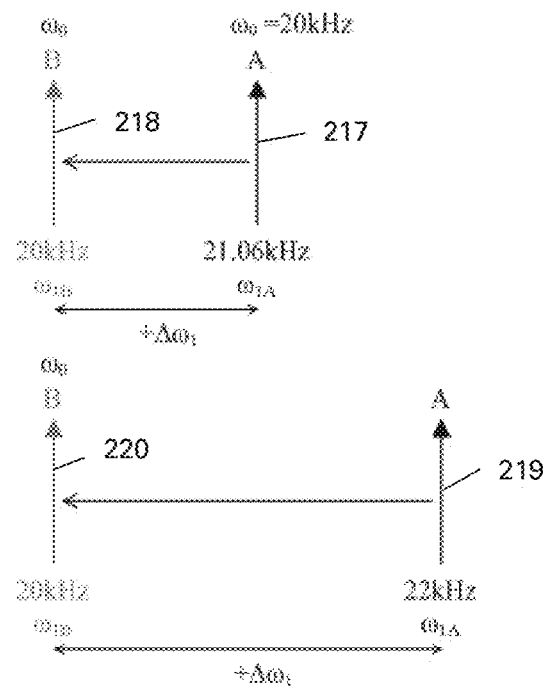
Figure 23:
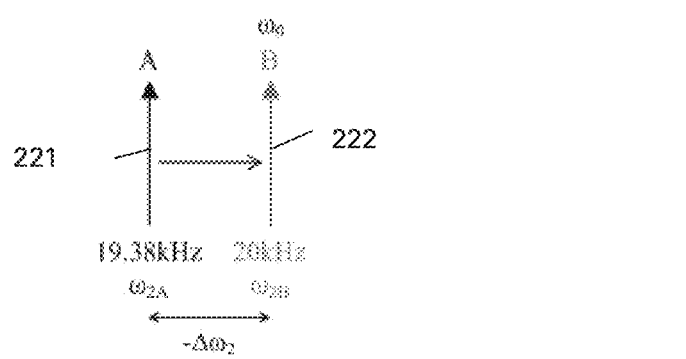

FIG. 23 relates to a parallel tuned LC pick up, with a system being tuned according to a new design.

Figure 24:
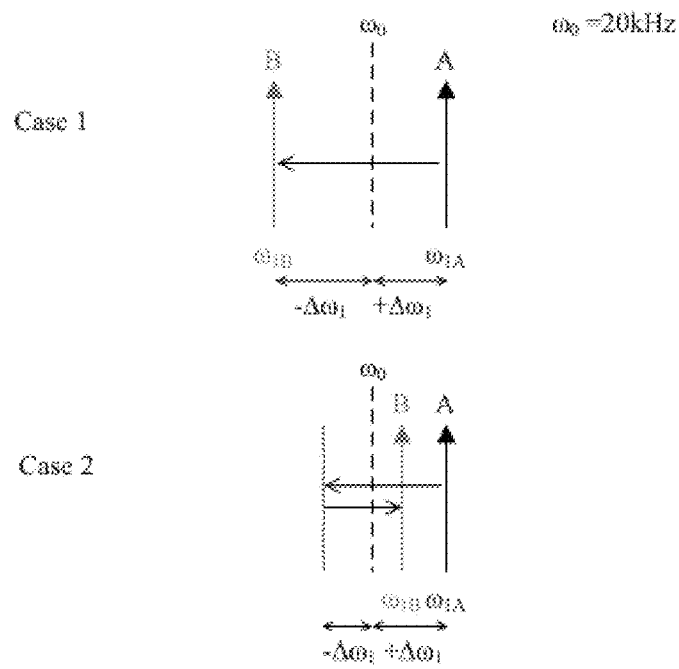
Figure 24:
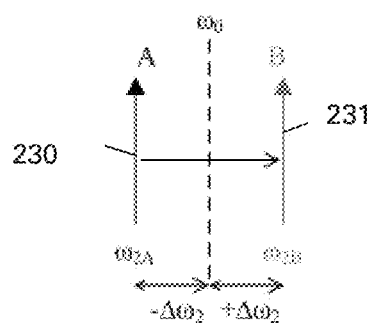

FIG. 24 shows an example of using a design described herein to minimise $VA_1$ and $VA_2$ individually.

Figure 25:
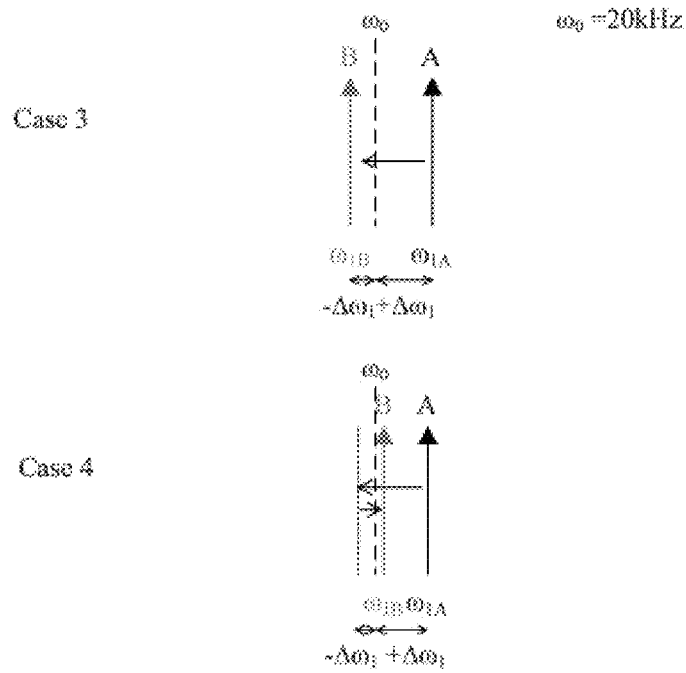

FIG. 25 shows examples of adjusting the $VA_2$ variation to assist minimising the $VA_1$ variation according to the invention.

DETAILED DESCRIPTION

As discussed in the background section above, in practise various changes in the resonant network of the primary resonant system and the secondary (or pickup) resonant system mean that the resonant networks for the primary and secondary become mistuned. Typically, a wireless power transfer system has an operating frequency which may be designated $\omega_o$. This operating frequency is typically the frequency of which the primary side power supply will energise the primary resonant network. However, when mistuning occurs, the resonant frequency under operating conditions for the primary and secondary resonant networks changes. In this document, the natural resonant operating frequency for the primary side is designated as $\omega_1$ and the natural resonant operating frequency for the secondary resonant network is referred to is $\omega_2$. As described above, the mistuning can be due to a number of factors such as changes and reactive component values over time, through degradation for example; manufacturing tolerances for the reactive components such as magnetic structures which are used to generate or receive fields for power transfer; manufacturing tolerances and tuning capacitors; self-inductance of the magnetic structures due to changes in relative position of the structures. These changes are quite distinct from variations in the load connected to the output of the secondary, being the load which the IPT system supplies with power.

Traditionally, in the design of wireless power transfer systems, particularly those in which there are "lumped" primary and secondary coils (i.e. a distinct winding on the primary side and a corresponding distinct, but not necessarily identical, winding on the secondary side) the standard approach in design has simply been to tune the primary and secondary resonant circuits at a known fixed relative displacement from each other. Usually the known relative position is either at the closest and most centrally located position within a defined space, or the furthest position within the defined operating space. Thus, referring to FIG. 10, when the secondary pad 12 is located at position A relative to the primary pad 10, then that corresponds to the closest position within a defined operating area which extends in a 100 mm from the centre of the primary pad and up to 150 mm in a vertical direction above the primary pad. When the secondary pad 12 is in a position as shown in FIG. 10, at point B the two pads are at the furthest relative position from each other within the defined operating area. Reference in this document to an IPT system or a wireless power transfer system pad means either the winding, or the complete magnetic structure which includes the winding is part of the primary and/or secondary resonant network which is used to transfer power inductively.

The approach to design described in the document is applicable to wireless or IPT systems that use a track and multiple pick-ups, as well as lumped systems. It is also applicable to different types of pick-up, for example "DDQ" and "Bipolar" pick-up structures such as those disclosed in international patent publications WO2011/016737 and WO2010/090539, the contents of which are incorporated herein by reference. Furthermore, those skilled in the art will appreciate that it can be applied to bi-directional systems.

The variations in coupling may be variations in reactive load that appear to be inductive or capacitive. The mistuning or variations in tuning may be mistuning or variations in reactive load that appear to be inductive or capacitive. For example, the variations in coupling may occur due to one or more of:

Changes in physical position of one or more pick-up devices relative to a track or a lumped primary structure;
Use of different pick-up magnetic structures, such as circular pick-ups, DDQ pick-ups and bipolar pick-ups.
The mistuning or variations in tuning may occur due to one or more of:
Component tolerances;
Manufacturing tolerances;
Component degradation, such as degradation of tuning capacitors over time, or other changes.
Changes in the componentry or magnetics, such as damaged ferrite.

This initial design does not elaborate on a method of minimising reactive power in the pick-up coil. This design emphasises minimising the reactive load in the inverter bridge. It also does not discuss minimising I1. These aspects are discussed further in other parts of this document.

Fundamental Structure of a Lumped Coil Battery Charging System

Figure 1:
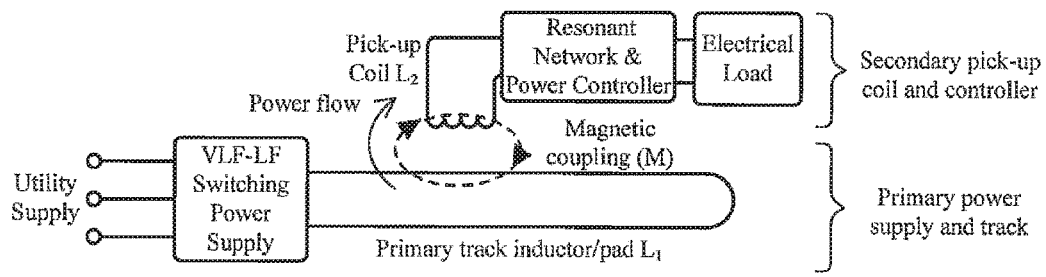
FIG. 1 is a schematic of a known IPT system.
Figure 2:
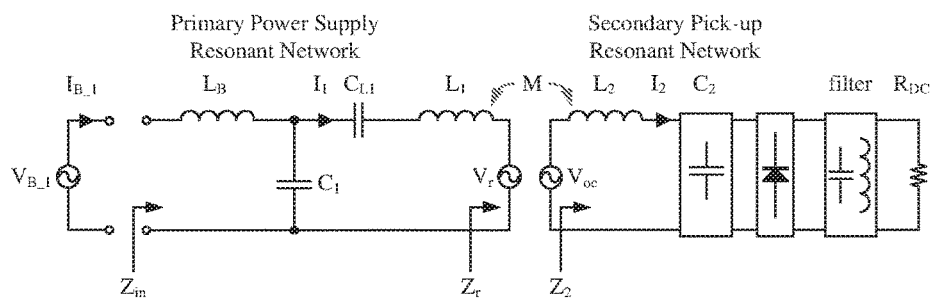
FIG. 2 is a circuit diagram of the fundamental structure of common wireless battery charging system which is referred to by way of example to describe the invention with reference to further drawings below.

The most common industrial IPT power supply topology is the full bridge voltage-sourced inverter with a series-parallel LCL resonant network. If only the fundamental frequency is considered, a conceptual representation of the power supply with a coupled pick-up is illustrated in FIG. 2 where the inverter bridge output is represented by its fundamental voltage component $V_{B\_1}$. In some cases a capacitor $C_{L1}$, in series with the primary track inductor $L_1$, is used to partially compensate $L_1$ to have a total reactance of X, the designed characteristic impedance of the primary LCL network. In a primary side current control system, minimal control is required in the pick-up so it consists of only the bridge rectifier and a DC filter. The track current is directly controlled by the fundamental component of the input inverter bridge voltage $V_{B\_1}$ as given in (1).

$$I_1 = \frac{V_{B\_1}}{X} \quad (1)$$

Figure 3:
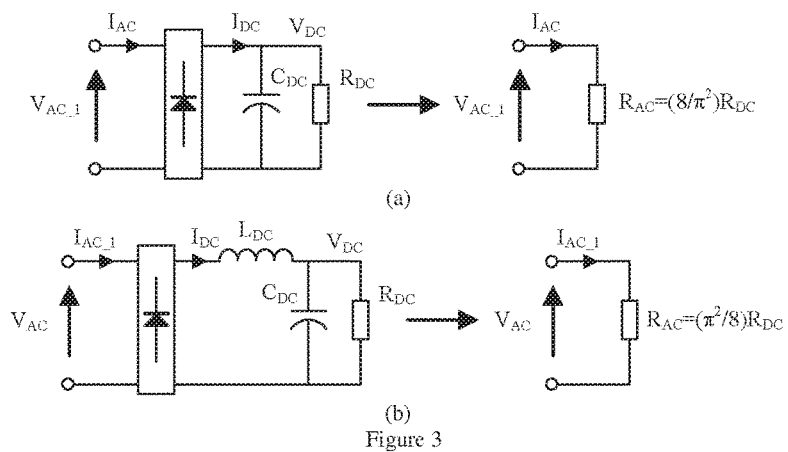
FIG. 3a is an equivalent AC resistive load of a full bridge diode rectifier with capacitor output filter for series tuned and LCL tuned pick ups.
FIG. 3b is an equivalent AC resistive load of a full bridge diode rectifier with inductor output filter for parallel tuned pick ups.

The three most common pick-up tuning topologies are series-tuned, parallel-tuned and LCL tuned topologies. Considering only the fundamental frequency, the pick-up can be modelled as an LCR circuit using an equivalent AC resistive load to represent the DC load as shown in FIG. 3. This equivalent AC resistive load for a series tuned or LCL tuned pick-up is given by:

$$R_{AC} = \frac{8}{\pi^2} R_{DC} \quad (2)$$

and for a parallel tuned pick-up is given by:

$$R_{AC} = \frac{\pi^2}{8} R_{DC} \quad (3)$$

While nominally there is some reactance introduced by the rectifier due to its non-linear characteristic for both series and parallel tuned networks which would result in mistuning the resonant network, this reactance is normally accounted for in the pick-up tuning capacitance. Hence it is not explicitly discussed here.

As the DC output is represented by its equivalent AC load, the reflected impedance of these three ideally tuned pick-up topologies can be directly applied here and are shown below:

$$Z_r = \begin{cases} \dfrac{\omega^2 M^2}{R_{AC}} = \dfrac{\omega M^2}{L_2} Q_2 & \text{series tuned} \\ \dfrac{M^2}{L_2^2}(R_{AC} - j\omega L_2) = \dfrac{\omega M^2}{L_2}(Q_2 - j) & \text{parallel tuned} \\ \dfrac{\omega^2 M^2 R_{AC}}{X_2^2} = \dfrac{\omega M^2}{L_2} Q_2 & \text{LCL tuned} \end{cases} \quad (4)$$

$X_2$ is the characteristic impedance of a series-parallel LCL tuned pick-up.

Equation (4) illustrates that the reflected impedance of both the series tuned and the LCL tuned pick-up have the same characteristic. The reflected load is purely resistive and is directly proportional to the pick-up loaded $Q_2$ when the pick-up coil is tuned in situ. As these two topologies share the same characteristic, in this document only the parallel-tuned and the series-tuned pick-ups are considered for variations in magnetic coupling.

Load Modelling of a Mistuned Primary and Secondary Resonant Network

In order to investigate the reactive load seen by the primary power supply due to a combination of both a mistuned primary and secondary resonant network, the reflected impedance of both a mistuned series-tuned and a mistuned parallel-tuned pick-up are considered. A model is developed, which, in conjunction with measured track tuning variations, allows the reactive load in the power supply inverter bridge to be calculated. In this section the load model of a mistuned pick-up is presented, followed by the model of a mistuned primary resonant network.

Reflected Impedance of Mistuned Pick-Up a) Series Tuned

Figure 4:
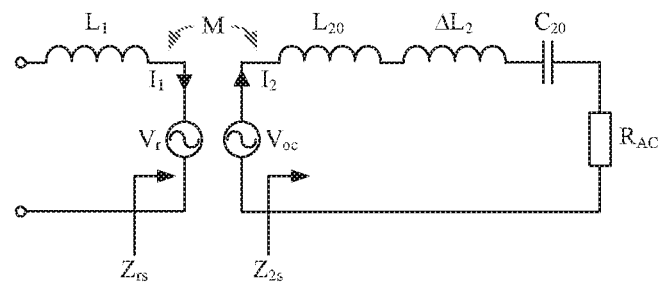
FIG. 4 is a conceptual diagram of a mistuned series tuned pick up. In this Figure both $L_{20}$ and $\Delta L_2$ are coupled with $L_1$.

The conceptual diagram of a mistuned series-tuned pick-up is shown in FIG. 4. The terms $L_{20}$ and $C_{20}$ are the (designed) nominal value of the pick-up inductance and its tuning capacitance. The variation in the pick-up inductance is modelled using the term $\Delta L_2$ i.e. a given charge in reactance which is defined by:

$$\Delta L_2 = L_2 - L_{20} \quad (5)$$

where $L_2$ is the pick-up inductance at the current physical position. The input impedance of the series-tuned pick-up $Z_{2s}$ is given by:

$$Z_{2s} = R_{AC} + j\omega L_{20} + \frac{1}{j\omega C_{20}} + j\omega \Delta L_2 \quad (6)$$
$$= R_{AC} + j\omega \Delta L_2$$

The definition of the pick-up reflected impedance $Z_r$ presented is given by:

$$Z_r = \frac{\omega^2 M^2}{Z_2} \quad (7)$$

Substituting (6) into (7), the mistuned series-tuned pick-up reflected impedance $Z_{rs}$ is then given by:

$$Z_{rs} = \frac{\omega^2 M^2 R_{AC}}{R_{AC}^2 + (\omega \Delta L_2)^2} - j \frac{\omega^2 M^2 (\omega \Delta L_2)}{R_{AC}^2 + (\omega \Delta L_2)^2} \quad (8)$$

Unlike the parallel tuned pick-up, where there is a load independent reflected reactance $(-jM^2/L_2)$, which is discussed further below, the reflected impedance of a series tuned pick-up is load dependent as demonstrated in (8). Therefore, for a series tuned pick-up the load dependent reflected impedance $\Delta Z_{rs}$ is the same as $Z_{rs}(\Delta Z_{rs}=Z_{rs})$. From (8), it can be seen that $\Delta L_2$ causes a reflected reactance, which has the opposite polarity to $\Delta L_2$. The real and the imaginary parts of (8) share many common terms, and it is convenient to derive an expression for the ratio between the reactive and the real load:

$$\frac{\text{Im}(Z_{rs})}{\text{Re}(Z_{rs})} = -Q_{20}\gamma \quad (9)$$

where $\gamma$ is the per unit (pu) variation of $\Delta L_2$ with respect to the designed tuning inductance $L_{20}$ and is defined by:

$$\gamma = \frac{L_2 - L_{20}}{L_{20}} = \frac{\Delta L_2}{L_{20}} \quad (10)$$

and $Q_{20}$ is the nominal loaded quality factor of the pick-up when tuned at the designed operating position, defined by:

$$Q_{20} = \frac{\omega L_{20}}{R_{AC}} \quad (11)$$

In a battery charging application running at a constant output voltage and power for the majority of the time, the load $R_{AC}$ and hence $Q_{20}$ are normally maintained constant. Therefore, (9) is a very useful expression for estimating the reactive power as it only consists of the designed circuit $Q_{20}$ and the pick-up inductance variation and directly indicates the polarity of the reflected reactive power.

Using the reflected resistive load in (8), the track current ($I_{1s}$) required to deliver the desired output power can be simply calculated using $P=Re(Z_{rs})I_{1s}^2$ and is given by:

$$I_{1s} = \frac{1}{\omega M}\sqrt{\frac{P_{out}(R_{AC}^2 + (\omega \Delta L_2)^2)}{R_{AC}}} \quad (12)$$

$$= \frac{1}{\omega M}\sqrt{P_{out}R_{AC}(1+(Q_{20}\gamma)^2)}$$

Using (12), the increase in track current $I_1$ as a result of the pick-up being mistuned can be expressed by:

$$\frac{I_{1s\_mistuned}}{I_{1s\_tuned}} = \sqrt{1+(Q_{20}\gamma)^2} \quad (13)$$

b) Parallel Tuned

Figure 5:
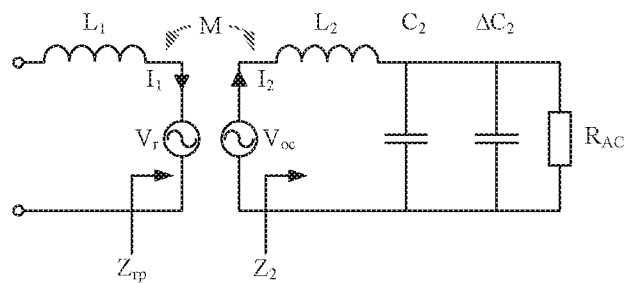
FIG. 5 is a conceptual diagram of a mistuned parallel tuned pick up.

The conceptual diagram of a mistuned parallel-tuned pick-up is shown in FIG. 5. Here the variation in tuning due to variations in $L_2$ is represented using the term $\Delta C_2$ which is given by:

$$\Delta C_2 = \frac{1}{\omega^2}\left(\frac{1}{L_{20}}-\frac{1}{L_2}\right) = C_{20} - C_2 \quad (14)$$

where $C_{20}$ is the nominal tuning capacitance with the designed value of $L_{20}$, and $C_2$ is the ideal tuning capacitance value of $L_2$. Using a Norton transformation on the pick-up resonant network, the pick-up coil current, and hence the pick-up reflected impedance $Z_{rp}$, can be described by:

$$Z_{rp} = \frac{M^2/R_{AC}}{\frac{L_2^2}{R_{AC}^2}+L_2^2(\omega \Delta C_2)^2} - j\frac{\omega M^2}{L_2} - j\frac{\omega M^2 \Delta C_2}{\frac{L_2^2}{R_{AC}^2}+L_2^2(\omega \Delta C_2)^2} \quad (15)$$

This expression (15) indicates that the reflected impedance of a mistuned parallel-tuned pick-up, has two reactive components. The first one is the reactive (capacitive) component ($-j\omega M^2/L_2$) which was described in (4). This capacitive component is independent of the load but proportional to the magnetic coupling. It is normally included in the primary track inductance when the power supply operates with a parallel-tuned pick-up at setup for systems with constant coupling (such as monorail systems). Variations in this term ($-j\omega M^2/L_2$) due to changes in the magnetic structure will not be discussed here as this is regarded as a change in the primary track inductance due to physical movement of the charging pad, but will be discussed further below. Therefore, the load dependent variable reflected reactive load is then defined as:

$$\Delta Z_{rp} = Z_{rp} - \left(-j\frac{\omega M^2}{L_2}\right) \quad (15)$$

Similar to the series-tuned pick-up, the second reactive component is introduced by the variable capacitor $\Delta C_2$ and exhibits a polarity opposite to that of $\Delta C_2$. The ratio between the load dependent variable reflected reactive load, which excludes the ($-j\omega M^2/L_2$) term, and the resistive load is given in (16) and it is nearly identical to (9) for the series-tuned pick-up.

$$\frac{Im(\Delta Z_{rp})}{Re(Z_{rp})} = -Q_{20}\delta \quad (16)$$

Here $\delta$ is the variation of $\Delta C_2$ with respect to the designed tuning capacitance $C_{20}$ and is defined by:

$$\delta = \frac{\Delta C_2}{C_{20}} = \omega^2 L_{20}\Delta C_2 \quad (17)$$

The nominal loaded quality factor $Q_{20}$ of the pick-up when tuned at the designed operating position is defined by:

$$Q_{20} = \frac{R_{AC}}{\omega L_{20}} \quad (18)$$

Using the resistive term of (15), the required track current for a mistuned parallel-tuned pick-up is then:

$$I_{1p} = \frac{L_2}{M}\sqrt{PR_{AC}\left(\frac{1}{R_{AC}^2}+(\omega \Delta C_2)^2\right)} \quad (19)$$

$$= \frac{L_2}{M}\sqrt{\frac{P}{R_{AC}}(1+(Q_{20}\delta)^2)}$$

Using (19), the increase in track current $I_1$ due to the pick-up being mistuned is given in (20), and as expected, is similar to (13):

$$\frac{I_{1p\_mistuned}}{I_{1p\_tuned}} = \sqrt{1+(Q_{20}\delta)^2} \quad (20)$$

Load Modelling of the Primary Resonant Network

Figure 6:
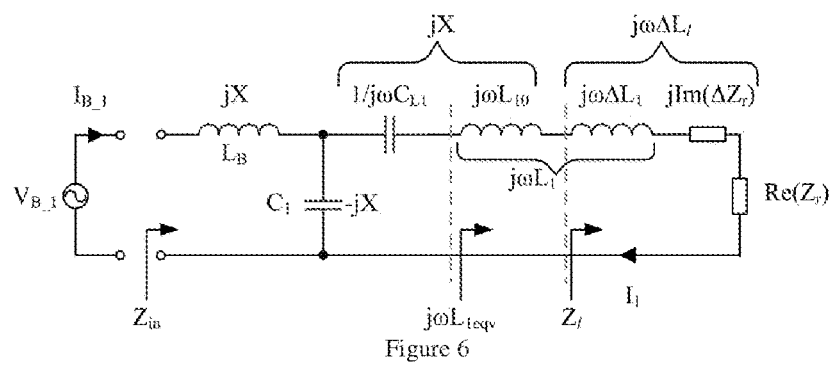
FIG. 6 is a conceptual diagram of the primary LCL network load moulding.

The conceptual diagram of a voltage-sourced LCL resonant power supply is shown in FIG. 6 with the pick-up equivalent reflected impedance ($Re(Z_r)+jIm(\Delta Z_r)$). As the reflected reactance is in series with the primary track inductance $L_1$, it is convenient to interpret $Im(\Delta Z_r)$ in terms of inductance. To define this pick-up equivalent reflected inductance $L_r$, the operating frequency $\omega$ is considered:

$L_r=Im(\Delta Z_r)/\omega(21)$ The measured primary track inductance $L_1$ within the given pick-up movement tolerance is separated into two components here: $L_{10}$ and a given change in reactance $\Delta L_1$ ($L_1=L_{10}+\Delta L_1$). $L_{10}$ is the nominally designed track tuning inductance, and its reactance combined with $C_{L1}$ is the primary LCL network characteristic impedance X. $\Delta L_1$ represents the difference between the measured track inductance $L_1$ and the nominal track inductance $L_{10}$. However, the total inductance variation seen by the power supply $\Delta L_l$ is a combination of $\Delta L_1$ and the pick-up reflected inductance $L_r$ as illustrated in FIG. 6 and (22). Thus it is difficult to estimate the overall inductance variation $\Delta L_l$ while choosing the tuning value $L_{10}$ based on measured $L_1$.

$$\Delta L_l = L_1 - L_{10} + \frac{\text{Im}(\Delta Z_r)}{\omega} \quad (22)$$
$$= \Delta L_1 + L_r$$
$$= \Delta X_l/\omega$$

Here $\Delta X_l$ is the total output reactive load of the LCL network.

Instead of choosing the tuning value $L_{10}$ based only on the measured value $L_1$, we have found that a preferable approach is to firstly combine the calculated pick-up reflected inductance $L_r$ together with $L_1$ to form one single inductive component called $L_{1eqv}$, which is the total equivalent track inductance seen by the tuning capacitor $C_{L1}$ as illustrated in Figure and in (23).

$$L_{1eqv} = L_1 + L_r \quad (23)$$
$$= L_{10} + \Delta L_l$$

Then based on the value of $L_{1eqv}$, $L_{10}$ can now be designed to minimise the variation in the total track inductance and to achieve a desirable pattern of $\Delta L_l$, within the misalignment tolerance, in order to minimise the reactive load within the primary power supply. This minimisation process is explained further below. The LCL network output impedance $Z_l$ is expressed by:

$$Z_l = \text{Re}(Z_r) + j\omega(\Delta L_l + L_r) \quad (24)$$
$$= \text{Re}(Z_r) + j\Delta X_l$$

Using (24), the input impedance ($Z_{in}$) of the primary LCL network is given by:

$$Z_{in} = \frac{X^2}{Z_l} \quad (25)$$
$$= \frac{X^2}{\text{Re}(Z_r) + j\Delta X_l}$$
$$= \frac{X^2 \text{Re}(Z_r)}{\text{Re}(Z_r)^2 + \Delta X_l^2} - j\frac{X^2 \Delta X_l}{\text{Re}(Z_r)^2 + \Delta X_l^2}$$

The input displacement power factor ($DPF_{LCL}$) of the primary LCL resonant network is then given by:

$$DPF_{LCL} = \frac{\text{Re}(Z_{in})}{\sqrt{\text{Re}(Z_{in})^2 + \text{Im}(Z_{in})^2}} \quad (26)$$
$$= \frac{\text{Re}(Z_r)}{\sqrt{\text{Re}(Z_r)^2 + \Delta X_l^2}}$$

Using the $V_{B\_1}$ expression in (1) and (26), for a given power $P_{out}$ the fundamental component of the inverter bridge current $I_{B\_1}$ is then given by:

$$I_{B\_1} = \frac{P_{out}}{DPF_{LCL} V_{B\_1}} \quad (27)$$
$$= \frac{P_{out}}{DPF_{LCL} I_1 X}$$

Design Considerations a) Additional Pick-Up Reactive Power Due to Mistuning

The additional reactive load $\text{Im}(\Delta Z_r)$ of both the series-tuned and parallel-tuned pick-ups, reflected back onto the track is proportional to the loaded $Q_{20}$ and the tuning variation $\gamma$ or $\delta$ respectively. $\text{Im}(\Delta Z_r)$ also represents an increase in the reactive load within the pick-up resonant network compared with an ideally tuned pick-up. Practical measurements of charging pad inductance indicate that the pad inductance has a variation of typically 2-7% depending on allowed (expected) misalignment. The pick-up loaded $Q_2$ for conventional distributed IPT systems is typically designed to be below 10 and for a practical IPT battery charging system is normally kept below 6. With a $Q_{20}$ value of 6, the additional reactive load is between 12-42% of the real power. If the magnetic structure has a bigger inductance variation ($\delta$ or $\gamma$>0.15), for the same $Q_{20}$ of 6, the additional reactive load would be 90% of the real power. This increases the stress in the pick-up resonant components and thus the component ratings need to be significantly higher than would be indicated by an ideally tuned design.

b) Increase of Track (Primary Pad or Winding) Current with Mistuned Pick-Up

Figure 7:
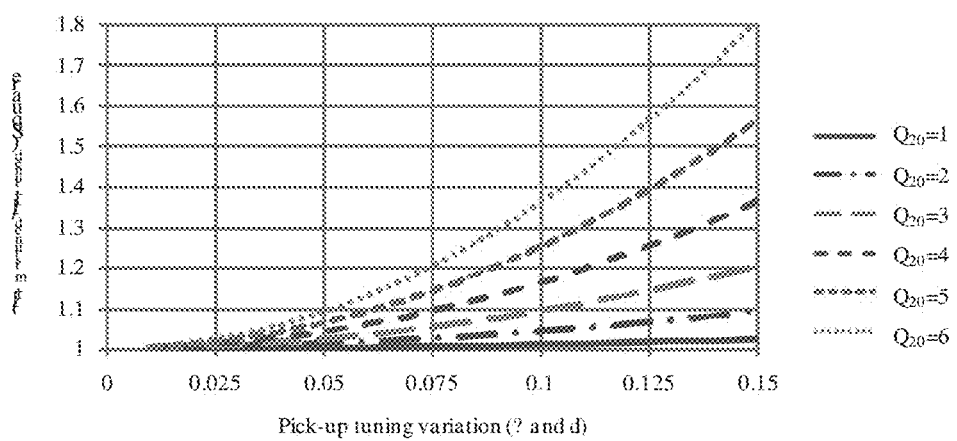
FIG. 7 is a graph showing track current variation against pick up tuning network variation for various values of $Q_{20}$.

Both (13) and (20) illustrate that the track current needs to be increased to deliver the same output power (constant $Q_{20}$ and $R_{AC}$ for primary side current control) to a mistuned pick-up. However, increasing $I_1$ also increases the track conduction loss. The square of the required track current increase ($I_{t\_mistuned}/I_{1\_tuned}$)$^2$, which represents the increase in the conduction loss, as a function of the pick-up tuning variation $\gamma$ and $\delta$ with various values of $Q_{20}$ is shown in FIG. 7. With a $Q_{20}$ of 3 and with a pick-up tuning variation of 7.5%, the increased conduction loss is 5% compared with a pick-up that is always tuned. With the same tuning variation but a $Q_{20}$ of 6, the conduction loss increase is 4 times higher (20%) as shown in FIG. 7.

As illustrated in (12) and (19), the required track current to achieve the same $Q_{20}$ is inversely proportional to the coupling condition. Thus, the increase in the track conduction loss will be more significant at operating positions with low coupling compared to operating positions with higher coupling. If a design decision is made to minimise the charging pad conduction loss without using self-tuning circuitry on the secondary side, the best practice for systems with high $Q_{20}$ (near 6) and high inductance variation ($\gamma$ or $\delta$>0.1) is to ensure the pick-up is tuned at the operating position with the lowest coupling.

c) Reactive Power Flow of the LCL Network

The input DPF of the primary LCL network is controlled by its output reactive load $\Delta X_l$ as illustrated in (26) where $Re(Z_r)$ is assumed to be constant at a fixed operating position during steady state. Therefore, choosing the primary tuning $\omega L_{10}$, which determines $\Delta X_l$, is key to determining the burden of reactive load on the inverter bridge within the specified pad power transfer zone. There are two considerations when choosing the primary tuning $\omega L_{10}$ and they are discussed following in this section.

(i) Ensuring Inductive Load ($Z_{in}$) for Inverter Bridge Voltage $V_{B\_1}$

The LCL tuning network has an impedance converting characteristic as illustrated in (25). Therefore by ensuring $\Delta X_l$ is either zero or capacitive within the misalignment tolerance, $Z_{in}$ is ensured to be either pure resistive or only slightly inductive. Thus, the DPF between $V_{B\_1}$ and $I_{B\_1}$ is either unity or slightly lagging which is normally preferred in inverter bridge design to prevent undesirable switching losses due to the diode reverse recovery currents in the switches.

(ii) Reactive Power Minimisation of the Primary LCL Network

In order to minimise the reactive load and to achieve the best possible input DPF of the primary LCL network, both the pick-up tuning $\omega L_{20}$ and the primary tuning $\omega L_{10}$ need to be chosen carefully to result in a desirable variation pattern of $\Delta X_l$. Using the expressions for the required track current in series and parallel-tuned pick-ups given in (12) and (19) respectively, the common definition of the LCL network output reactive power can be expressed by:

$$VAR = I_1^2 \Delta X_l \quad (28)$$
$$\propto \frac{\Delta X_l}{M^2}$$

This indicates that the additional reactive load within the LCL network is proportional to $\Delta X_l$ and inversely proportional to $M^2$ which represents the relative coupling variation for a given charging pad design. Therefore, in order to minimise the reactive load, the variation in $\Delta X_l$ should be minimised at an operating position where the coupling ($M^2$) is at its lowest, so that the overall reactive load seen by the inverter bridge is minimised.

d) Inverter Bridge Current

Using the track current expressions in (12) and (19), and the inverter bridge current $I_{B\_1}$ expression in (27), $I_{B\_1}$ can now be expressed in terms of the output power, the mutual coupling and the DPF, as shown in (29), indicating that $I_{B\_1}$ is directly proportional to the output power and the magnetic coupling.

$$I_{B\_1} \propto \frac{P_{out} M}{DPF_{LCL}} \quad (29)$$

For a variable coupling system using primary side current control, the inverter bridge current will necessarily have the same range of variation as the magnetic coupling in order to maintain the output power to be constant. This bridge current variation needs to be treated carefully and the power supply inverter design necessarily needs to be rated for the maximum possible coupling variation.

e) Design Flow Chart

As discussed earlier, conventionally, the tuning network of a lumped coil system is designed based on the physically measured charging pad inductances at the same operating position, which then becomes the optimum position of operation. However, when designing tuning networks for lumped coil systems with a specified power transfer zone, there are a number of design issues that need to be considered in order to achieve a suitable result.

Figure 8:
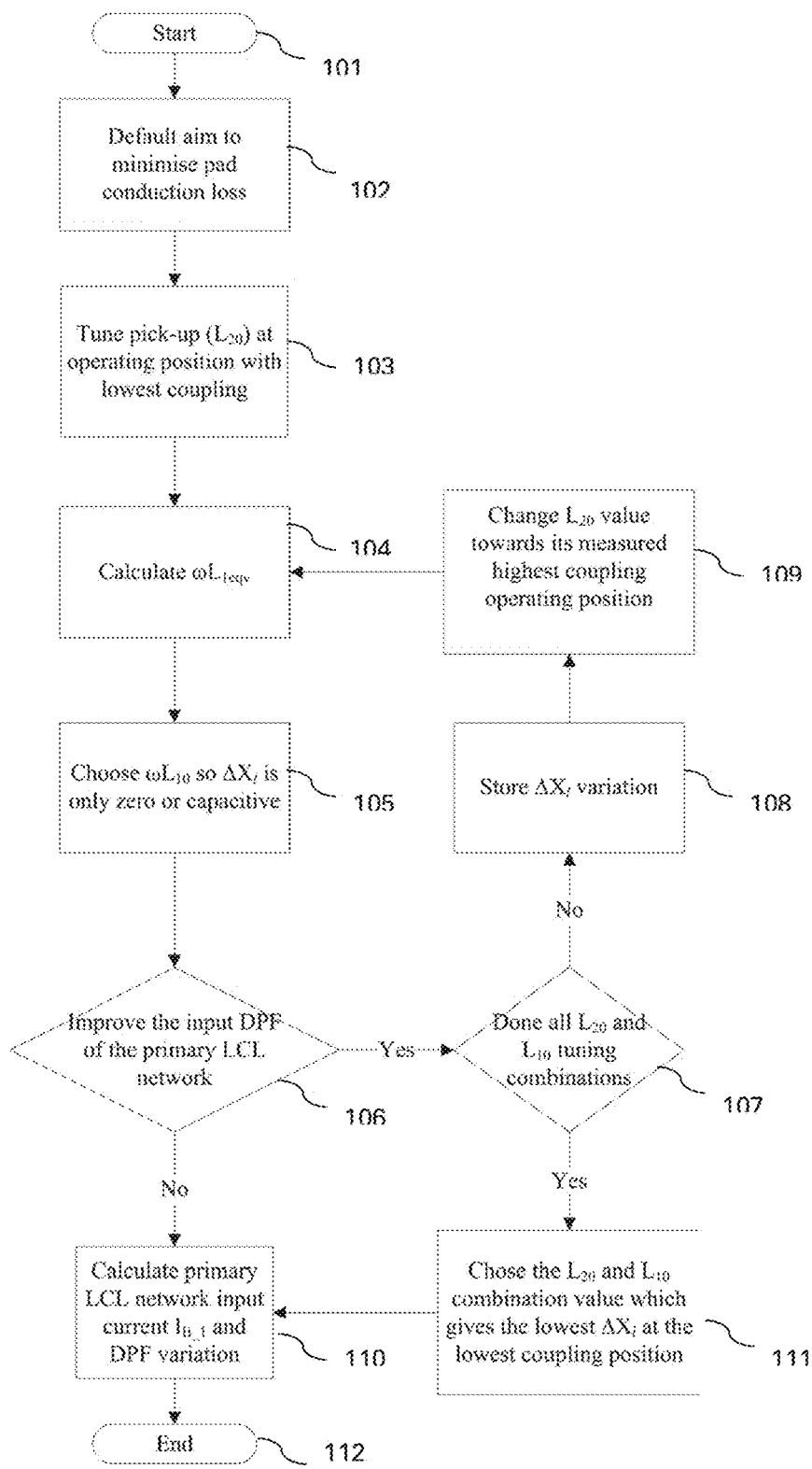
FIG. 8 is a flow chart showing a sequence of design steps, for selecting one or more components of the primary and/or secondary resonant network to achieve one or more practical outcome, such as containing the reactive load seen by the primary power source.

In practice, it is difficult to achieve all the considerations presented above in one tuning network. To assist the design process, a design flow chart which combines the considerations discussed earlier is presented in FIG. 8. This flow chart presents a sequence of design steps, for selecting one or more components of the primary and/or secondary resonant network to achieve one or more practical outcome, such as containing the reactive load seen by the primary power supply. Referring to FIG. 8, the process begins at 101 and the "default" objective is to minimise pad conduction loss at 102. The first design step 103 is to select $L_{20}$ to design the secondary tuning at the operating position with the lowest coupling. Then in step 104 $\omega L_{1eqv}$ is calculated, having designed the pick-up (i.e. secondary) tuning, $L_R$ is known and $L_{1eqv}$ can be calculated from the initial measured value of $L_1$. Next in step 105 $\Delta \omega L_{10}$ is chosen so that $\Delta X_1$ is only zero or capacitive. Choosing $\Delta X_1$ to be capacitive means that means that it is seen as an inductive load by the power supply i.e. the H bridge of the converter which energises the primary network. In step 106 the reactive load can be further considered in order to ensure that the input displacement power factor for the primary LCL network is improved by proceeding through a loop to step 107 to check whether all the $L_{20}$ and $L_{10}$ tuning combinations have been covered. If they haven't, then the $\Delta X_1$ variation is stored in step 108 and in step 109 the $L_{20}$ value is changed to all its measured highest coupling operating position and the process returns to step 104 wherein $\omega L_{1eqv}$ is calculated again. If at step 106 no improvement is required to the input displacement power factor, then at step 110 the primary LCL network input current is calculated together with the displacement power factor variation and the flow chart ends at step 112. If at step 107 all $L_{20}$ and $L_{10}$ tuning combinations have been considered, then the process proceeds to step 111 at which the $L_{20}$ and $L_{10}$ combination value which gives the lowest variation in reactive load i.e. lowest $\Delta X_1$ at the lowest coupling position as chosen following which the process returns to step 110. It will be appreciated that this is simply one methodology which can used to enable the invention. A design example is now considering the primary tuning $L_{10}$ in order to achieve the design requirements which include minimising the primary pad conduction loss, or achieving the best possible input DPF in the primary LCL network. The default design focus is to minimise the primary charging pad conduction loss and thus the pick-up tuning is designed accordingly. If minimising the reactive load in the primary resonant network is the priority, the primary and the secondary tuning is then adjusted to achieve this.

Figure 8A:
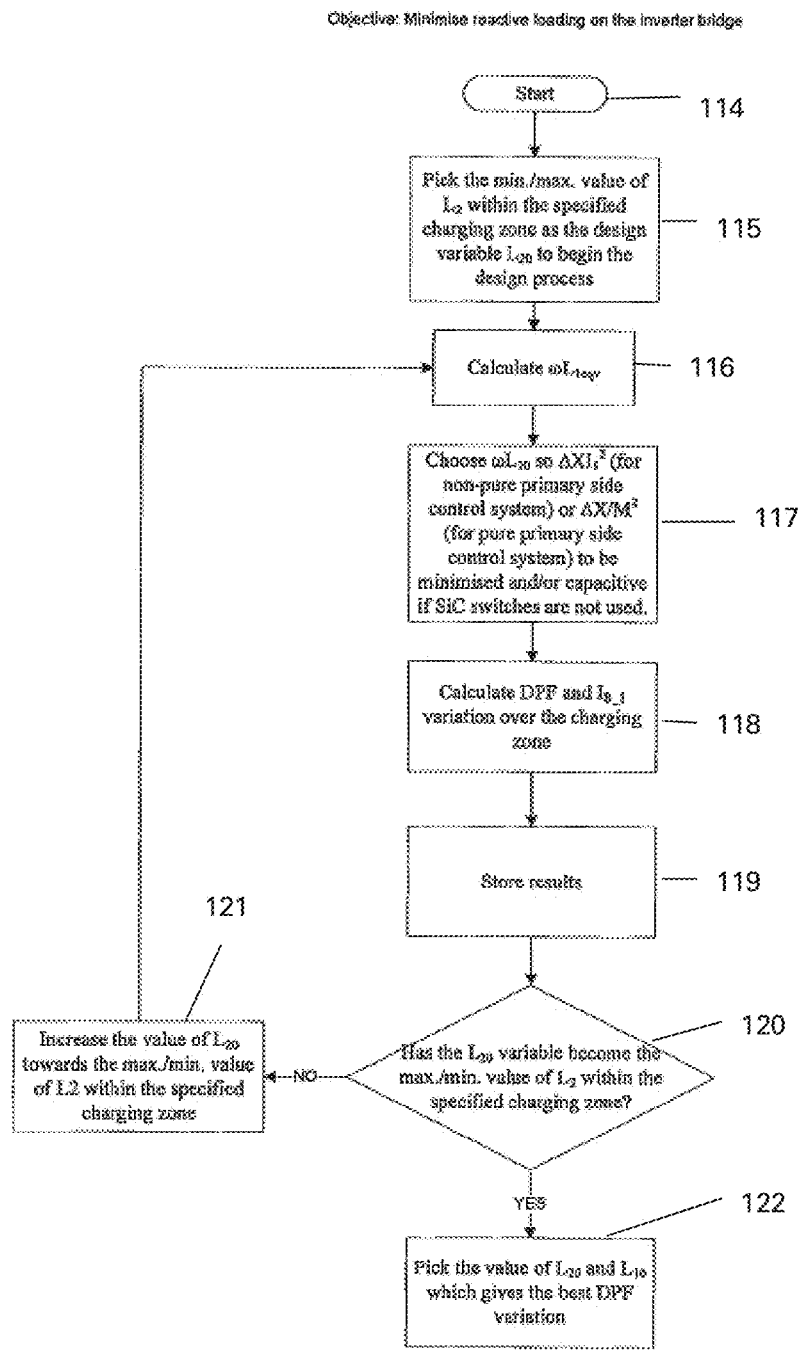
FIGS. 8a to 8c are flow charts showing various design processes for creating IPT systems or IPT system components according to the invention.
Figure 8B:
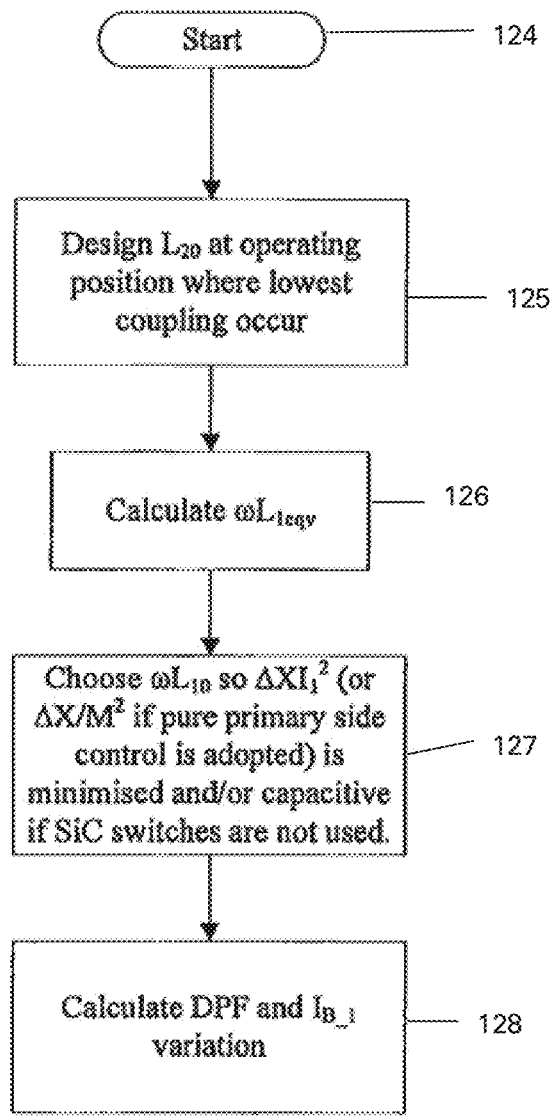
Figure 8C:
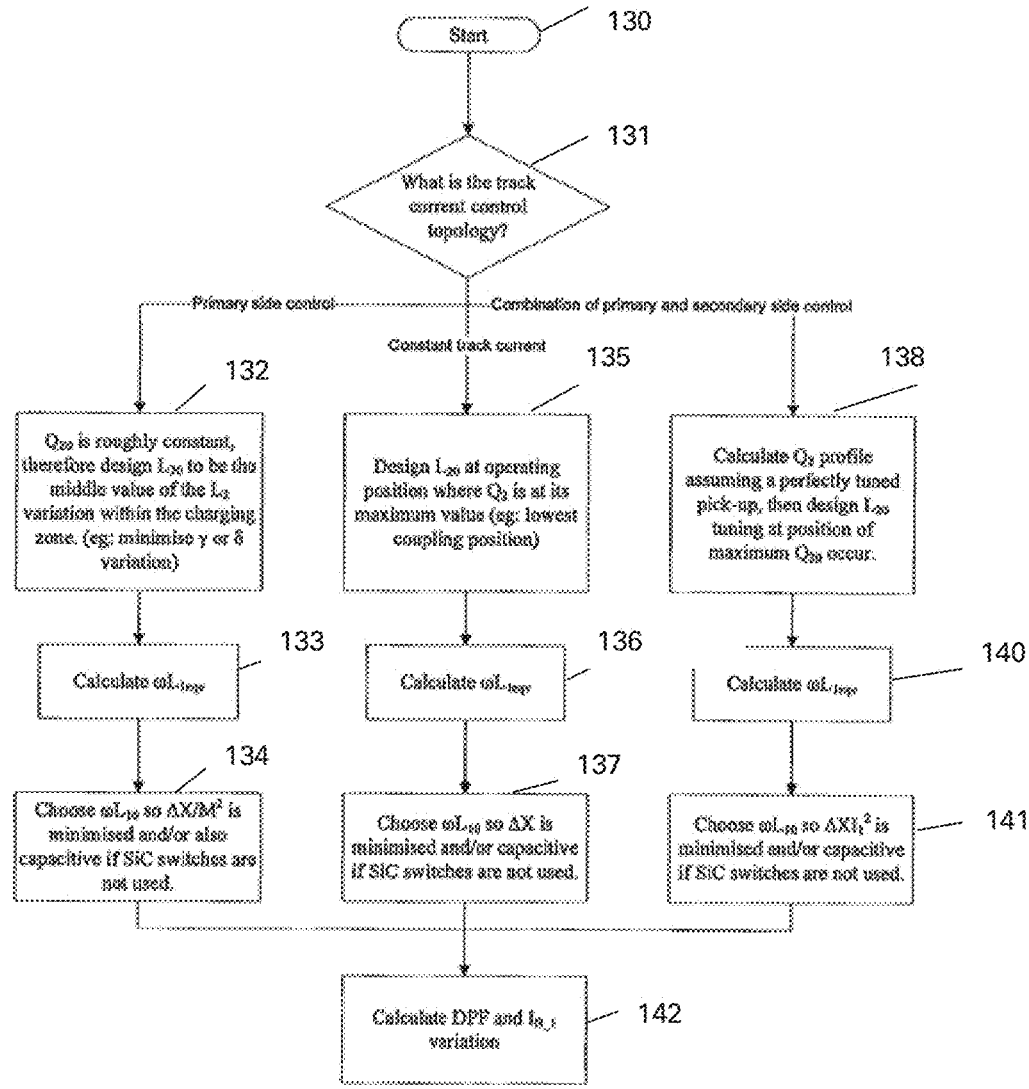

Further examples are shown in FIGS. 8a to 8c. In FIG. 8a the design objective is to minimise the reactive loading on the inverter bridge i.e. minimise the reactive loading seen by the power supply. The process starts in step 114, then $L_{20}$ is selected in step 115. $\omega L_{1eqv}$ is calculated in step 116 following which $\omega L_{10}$ is chosen at step 117. The displacement power factor and primary current variation are calculated in step 118 and results stored in step 119. At step 120 a decision is made as to whether $L_{20}$ has become the maximum or minimum value of $L_2$ within the charging zone which determines a given variation in coupling. If yes, then the process ends with selecting the values of $L_{10}$ and $L_{20}$ which give the best power factor variation. If no, then the value of $L_{20}$ is increased and the process returns to step 116.

In FIG. 8b the design objective is to minimise the primary current i.e. minimise primary pad conduction loss. The process starts at step 124 following which $L_{20}$ is selected at the point of lowest coupling in the specified area of coupling variation determined by the required charging zone. $\omega L_{1eqv}$ is calculated in step 126 following which $\omega L_{10}$ is chosen at step 127. The displacement power factor and primary current variation are calculated in step 128 to complete the process.

In FIG. 8c the design objective is to minimise additional pick-up (secondary) reactive power due to mistuning. The process starts at step 130. The primary winding current control topology is then selected in step 131. If primary side control is used, then the process proceeds to step 132 in which $L_{20}$ is chosen to be in the middle of the $L_2$ variation within the charging zone. Then $\omega L_{1eqv}$ is calculated at step 133 and $\omega L_{10}$ is chosen in step 134. The process ends at step 142 in which the displacement power factor and primary current variation are calculated. If instead a constant track current topology is used, then the process proceeds from step 131 to 135 in which $L_{20}$ is selected for the operating position with lowest coupling. Then $\omega L_{1eqv}$ is calculated at step 136 and $\omega L_{10}$ is chosen in step 137 before the final step 142. If instead a combination of primary side and secondary side control topology is used, then the process proceeds from step 131 to 138 in which the $Q_2$ profile is calculated assuming a perfectly tuned pick-up then $L_{20}$ is selected for tuning at the position of maximum $Q_{20}$. Then $\omega L_{1eqv}$ is calculated at step 140 and $\omega L_{10}$ is chosen in step 141 before the final step 142.

Design Example

A tuning network for a 1.2 kW EV battery charging system designed using the strategy described with reference to FIG. 8 is now presented by way of example. The analytical results determined using the designed network are compared against systems with charging pad tuning networks designed at both the maximum and minimum coupling position to demonstrate the improvement in the input loading variation of the primary LCL network. The analytical results of the proposed design are also verified against SPICE simulations.

System Parameters a) Primary Power Supply

Figure 9:
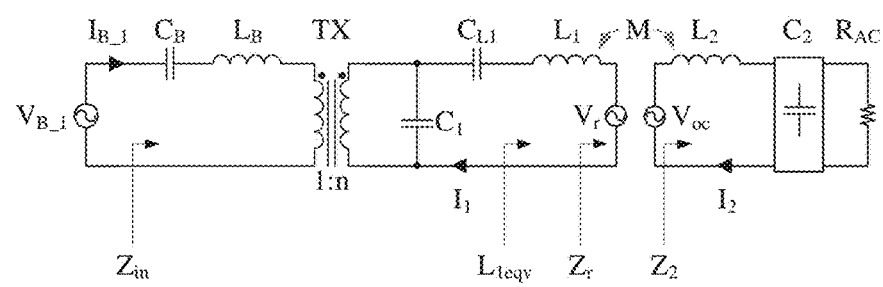
FIG. 9 is a diagram showing the structure of a 1.2 kilowatt battery charging system with equivalent AC resistor load at the pick up output.

The conceptual structure of the 1.2 kW battery charging system is shown in FIG. 9 and its parameters are given in Table 1 below. The inverter bridge voltage $V_{B\_1}$ has a voltage variation range of 0 to 225V RMS to perform primary side current control for regulating the power flow to the pick-up load ($R_{AC}$). As explained in Section 0, the AC load $R_{AC}$ has different values for series and parallel-tuned pick-ups in order to have the same equivalent DC output power and voltage.

TABLE 1

Parameters of the 1.2 kW battery charging system

| $V_{B\_1}$ range | 0-225 V RMS | $L_B$ | 87 µH | $P_{out}$ | 1.23 kW |
|---|---|---|---|---|---|
| Frequency | 20 kHz | $C_B$ | 1.043 µF | $R_{AC}$ (series) | 26.34 Ω |
| TX turns ratio | 1:2 | $C_1$ | 0.602 µF | $R_{AC}$ (parallel) | 40 Ω |
| $X_{LCL}$ | 13.22 Ω | $I_1$ max | 34 A RMS | | | b) Charging Pad Magnetic Structure

The selected charging pad magnetic structure in this design example is a 700 mm circular charging pad. The operating air gap is between 100 mm and 150 mm with a lateral tolerance of ±100 mm. This forms a rectangular boundary within a specified power transfer zone as illustrated in FIG. 10. The position where the pick-up pad is at the tightest coupling position (closest to the primary pad) is labelled "A" and the position where the pick-up pad has the lowest coupling position is labelled "B" in the diagram. The proposed tuning strategy and conventional tuning methods are examined with the pick-up pad moving along the horizontal boundary (δx from 0 to 100 mm) at the extreme vertical boundary (150 mm and 100 mm).

The magnetic structures of both charging pads are identical. The primary pad adopts a bi-filar winding with 12 turns. Regarding the secondary pad, a different number of turns is used for the series and parallel-tuned pick-up. The series-tuned pick-up acts as a voltage source and therefore boosts the current while the parallel-tuned pick-up acts as a current source and boosts its output voltage. In order for these two tuning topologies to have the same output DC voltage and power with the same magnetic structure, the number of turns on the pick-up pad needs to be designed for a suitable open circuit voltage ($V_{oc}$) and short circuit current ($I_{sc}$) ratio. The winding structure of each of the charging pads which achieves the same equivalent DC output characteristics used in this design example is outlined in Table 2.

TABLE 2

Winding structures of the 700 mm circular charging pad for both primary and secondary

| | Winding structure |
|---|---|
| Primary charging pad | Bi-filar with 12 turns (2 × 12 turn) |
| Secondary charging pad: series-tuned pick-up | Single wire with 24 turns |
| Secondary charging pad: parallel-tuned pick-up | Bi-filar with 12 turns (2 × 12 turn, identical to the primary pad) |

Figure 11:
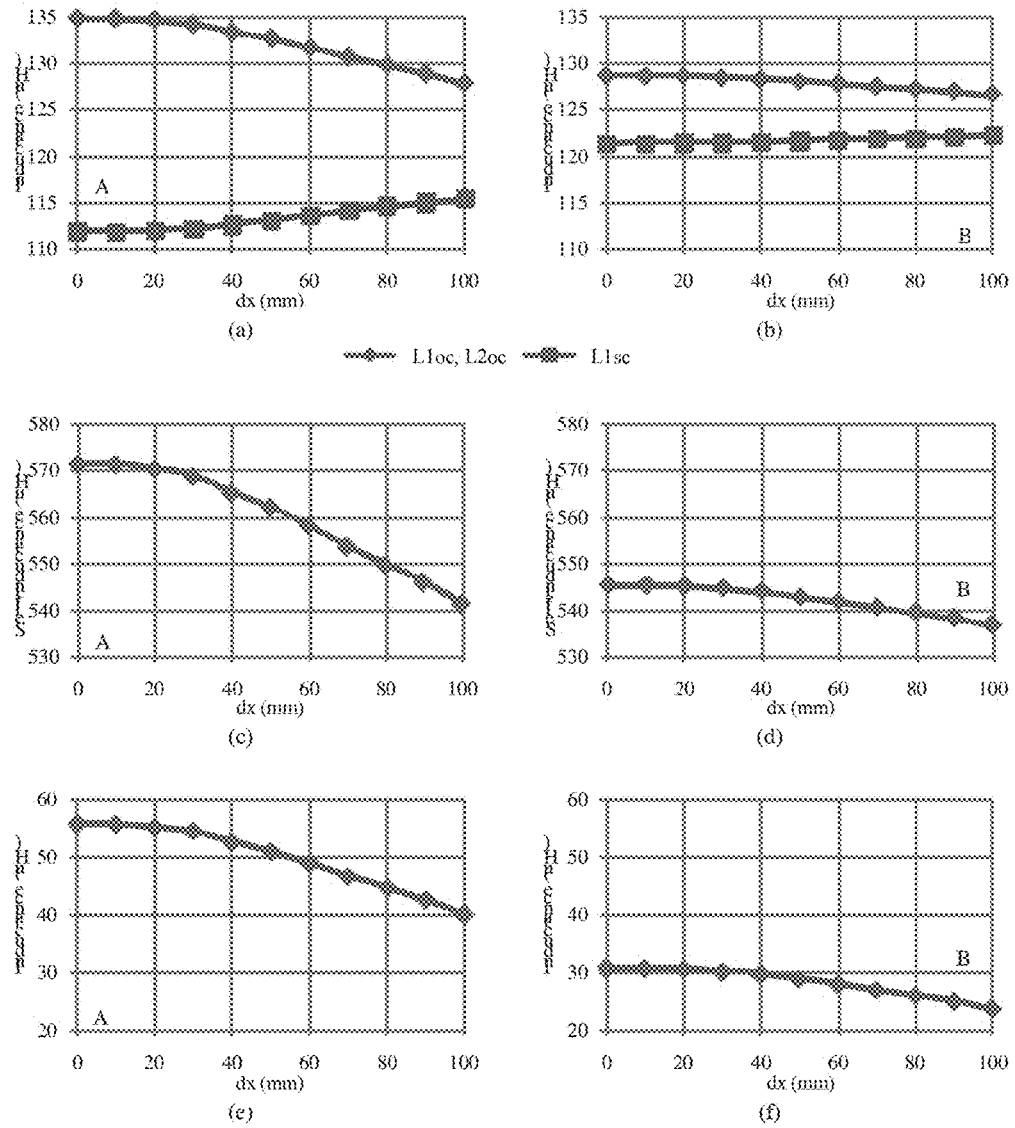
FIGS. 11a to 11f show measurements of a 700 mm circular charging pad for changes in the x direction at a z axis direction of 100 mm and 150 mm.

Measured inductances of the circular charging pad at an air gap of 100 mm and 150 mm with x direction movement between 0 to 100 mm are shown in FIG. 11. The open-circuit bi-filar pad inductance measurements are for primary pad tuning when a series-tuned pick-up is used, while the short-circuited inductance measurements are for primary pad tuning when a parallel-tuned pick-up is used. This is because the short-circuited measurements include the pad self-inductance $L_1$ and pick-up reflected capacitive component ($-M^2/L_2$) as illustrated in (30).

$$L_{1sc} = L_1 - \frac{M^2}{L_2} \qquad (30)$$

Since the secondary charging pad in a parallel-tuned pick-up has the same winding structure as the primary pad, the self-inductance of the secondary pad is identical to the measured primary self-inductance shown in FIGS. 11 (a) and (b). The measured secondary pad self-inductance with a single wire wound structure as used in the series-tuned topology is shown in FIGS. 11 (c) and (d). The calculated mutual inductance using the open-circuit and short-circuit measurements are shown in FIGS. 11 (e) and (f). This calculated mutual inductance is referred back to the primary side. When using this calculated mutual inductance value with a series-tuned pick-up, a turns ratio of 2 needs to be taken into account.

These measurements indicate that the charging pad self-inductance has a variation of 7% from the operating position with maximum coupling (labelled A on the graph) to the minimum coupling position (labelled B on the graph). This variation occurs due to the relative physical movement between the ferrimagnetic materials and the coils in the charging pad. The coupling variation between the two extreme points A and B is about a factor of two as shown in Figure (e) and (f) where the mutual inductance varies from 55 µH to 23 µH. Performances of the various tuning options.

Performances of the Various Tuning Options

In this design example, the maximum variation in inductance is below 7% and the value of the loaded $Q_2$ is below 3, which is given in the next section. With such low inductance variations and a small $Q_2$, the required increase in track current to deliver the rated power with a mistuned pick-up is only in the range of 2-3% as illustrated in FIG. 7. Therefore, the pick-up is not necessarily required to be tuned at the minimum coupling position B, so the tuning network design focus is then to minimise the input load variation of the primary LCL network. The performance of the system, designed using the proposed strategy, is compared against systems with both charging pads designed at the maximum coupling position, which is referred to as "AA", and at the minimum coupling position, which is referred to as "BB".

a) Series Tuned Pick-Up

The parameters of the tuning network designed at operating position AA, BB and designed using the proposed methodology discussed in connection with FIG. 8 are given in Table 3 below. In the design using the proposed methodology, the nominal tuning value of the pick-up pad $L_{20}$ is its self-inductance at the minimum coupling position B and the nominal tuning value of the primary pad is a calculated value of 128 µH as determined from FIG. 12 (d) and explained later. The analytical results of these three tuning network designs are shown in FIG. 12 and the proposed design is verified with SPICE simulations which are shown in FIG. 13.

TABLE 3

Tuning network parameters of the various tuning options for series-tuned pick-up

| AA: | $L_{10}$: | 134.8 µH | $C_{L1}$: | 2.14 µF | $L_{20}$: | 571.31 µH |
|---|---|---|---|---|---|---|
| | $Q_{20}$: | 2.73 | Max. γ: | −0.0607 | | |
| BB: | $L_{10}$: | 126.57 µH | $C_{L1}$: | 2.963 µF | $L_{20}$: | 536.61 µH |
| | $Q_{20}$: | 2.56 | Max. γ: | 0.0647 | | |
| New tuning design: | $L_{10}$: | 128 µH | $C_{L1}$: | 2.778 µF | $L_{20}$: | 536.61 µH |
| | $Q_{20}$: | 2.56 | Max. γ: | 0.0647 | | |

In the calculated pick-up reflected equivalent inductance $L_r$ shown in FIGS. 12 (a) and (b), tuning option AA has the smallest variation compared with tuning option BB and the new tuning design option. But in the $L_{1eqv}$ graph shown in FIGS. 12 (c) and (d), tuning option AA has the biggest primary inductance variation seen by the tuning capacitor $C_{L1}$ compared with the other options. Since the biggest $\Delta X_I$ for tuning option AA occurs at the minimum coupling position, it has the biggest reactive load variation at the input of the primary LCL network as shown in FIG. 12 (e) to (h).

FIG. 12 (d) demonstrates that the biggest value of $L_{1eqv}$ in the new tuning design is 128 µH and hence that is the chosen $L_{10}$ value. Although option BB demonstrates the best DPF performance compared with the new tuning as shown in FIG. 12(f), option BB also results in a capacitive load at the input of the LCL network for the pick-up pad moving in the x direction at the 150 mm air gap. Therefore, the new tuning design has minimised the primary DPF variation while keeping the load on the inverter bridge inductive. The SPICE simulation results of the new tuning design, given in FIG. 13, show very good agreement with the analytical results.

b) Parallel Tuned Pick-Up

The parameters of the tuning network designed at operating position AA, BB and the new tuning design are given in Table 4. In the new tuning design the nominal tuning value of the pick-up pad $L_{20}$ is its self-inductance at the maximum coupling position A and the nominal tuning value of the primary pad is calculated to be 123.8 µH as determined from FIG. 14 (d) and explained later. The analytical results of these three tuning network designs are shown in FIG. 13 and the proposed design is verified against SPICE simulations shown in FIG. 15.

TABLE 4

Tuning network parameters of the various tuning options for parallel-tuned pick-up

| AA: | $L_{10}$: | 111.81 µH | $C_{L1}$: | 9.58 µF | $L_{20}$: | 134.8 µH |
|---|---|---|---|---|---|---|
| | $Q_{20}$: | 2.36 | Max. δ: | −0.065 | | |
| BB: | $L_{10}$: | 122.17 µH | $C_{L1}$: | 3.73 µF | $L_{20}$: | 126.57 µH |
| | $Q_{20}$: | 2.515 | Max. δ: | 0.061 | | |
| New tuning design: | $L_{10}$: | 123.8 µH | $C_{L1}$: | 3.4 µF | $L_{20}$: | 134.8 µH |
| | $Q_{20}$: | 2.36 | Max. δ: | −0.065 | | |

In the calculated pick-up reflected equivalent inductance ($L_r$) and the primary $L_{1eqv}$ inductance shown in FIGS. 14 a)-(b) and (c)-(d) respectively, tuning option AA and the new tuning design have the smallest variation compared with tuning option BB. In the $L_{1eqv}$ graph shown in FIG. 14 (d), the calculated $L_{1eqv}$ graph has a maximum value of 123.8 µH and hence that is the chosen $L_{10}$ value for the design.

Although tuning option AA has the same $L_{1eqv}$ variation as the new tuning design, FIG. 14 (e) to (f) indicate that option AA has the bigger reactive load variation and is capacitive. The reason for this is that the primary is tuned at position A so the biggest variation of $\Delta X_I$ occurs at the minimum coupling position B which then results in the biggest additional reactive load compared with others. The analytical results in FIG. 14 (e) to (f) also demonstrate that the new tuning design is inductive and has the least input DPF variation, which is between unity and 0.976. The SPICE simulation results of the new tuning design are shown in FIG. 15 and again demonstrate very good agreement with the analytical results.

Inverter Bridge Current Variation

As discussed in above, the inverter bridge current is directly proportional to the coupling of the magnetic structure. In this design example, the mutual inductance of the charging pad varies from 23 µH to 55 µH. This implies that the inverter bridge current will also have same degree of variation.

The SPICE simulation results for the inverter bridge voltage and current operating under the rated load of 1.2 kW with both series and parallel-tuned pick-ups are shown in FIG. 16 (a) to (d). The tuning networks are designed using the proposed strategy of Section 0 so the reactive component in the bridge current has been minimised as much as possible. The simulation results show that the inverter bridge voltage varies from 90 to 200V RMS as the coupling changes while the inverter bridge current varies from 15 to 6 A RMS. In order to lower the LCL network input voltage from 200V RMS to 90V RMS, the inverter bridge will necessarily be working over a wide variation of phase shifts θ to achieve a wide $V_{B\_1}$ variation. While the inverter bridge operates with small phase shifts to lower $V_{B\_1}$, the current $I_{B\_1}$ will be at its highest value, as illustrated in FIG. 16. For higher power systems, in the range of 7 kW, this wide variation of $I_{B\_1}$ complicates the inverter bridge design and makes the semi-conductor switch selection difficult.

Alternative Magnetic Structure

The developed tuning network design strategy can be used on any magnetic structure. The key parameter, as mentioned in the circular pad example, is the boundary of movement or tolerance within the specified power transfer zone. The circular pad has rotational symmetry therefore the design example requires only lateral direction of movement with vertical movement to determine the tuning design. For a Double D (referred to earlier in this document) charging pad, the defined boundary of the power transfer zone is a rectangular prism as illustrated in FIG. 17. This is due to its polarised structure. Therefore, in order to design the tuning network for systems using Double D pads, the required inductance measurements are along the boundary of the two square plans at the extremes of vertical offset. These two plans are A-B-C-D and E-F-G-H as indicated in FIG. 17. Thus it will be seen that the invention is applicable to wireless power transfer system which may use a variety of magnetic structures.

Frequency Considerations

The standard approach has as described earlier has simply been to tune the primary and secondary pads at a known fixed separation from each other. Normally this is either at the closest and most centrally located position A or at the furthest position B (as shown in FIG. 10). Given the primary and secondary pads are normally both tuned at one of these locations, these two design options are labelled AA and BB in FIGS. 18 to 25. For the examples described earlier then the shift in the actual tuned frequency of both the primary and secondary from the ideal system operational tuned frequency ωo due to allowable relative movement of the pads, can be viewed in FIGS. 10 and 11 for series tuned secondary or in FIGS. 22 and 23 for a system with a parallel tuned secondary. Here the variations in tuned frequency arise only due to the relative movement of the pads, but other factors such as mistuning over time can add to the change. As shown, this can cause large changes in the natural resonant tuned frequency ($\omega_1$) of the primary pad during operation or of the natural resonant frequency ($\omega_2$) of the secondary pad during operation. A smaller variation (spread) in the tuned frequency of either $\omega_1$ or $\omega_2$ is naturally beneficial, and if this variation controlled so that it is whatever is best for the power supply (e.g. in an LCL primary network it is best to be capacitive, which translates to an inductive load viewed from the power supply) so that the inverter only needs to produce extra inductive VARs (due to this mistuning) during operation, then that is also beneficial.

In FIG. 18 the primary and secondary pads are tuned at the AA position and the secondary resonant network is series tuned. Referring to that Figure, arrow 201 shows the operating frequency of the primary at position A, which has the system operating frequency $\omega_0$ of 20 kHz. As the secondary is moved from position A to position B sat 202, the frequency of the primary moves from 20 khz to 20.83 khz. This change is represented by $\Delta\omega_1$ and is based on measuring the inductance changes between the two positions when the system is not operational. However, as we have described earlier, the variation in frequency of the primary based on those inductance measurements is actually incorrect. Instead, the actual resonant frequency variation during operation is represented by arrow 203. This shows that the initial resonant frequency at position A which is 20 kHz as represented by arrow 201, changes to 20.66 kHz when the secondary is moved to position B, as indicated by arrow 203.

Similarly, the change in the resonant frequency of the secondary network during operation is illustrated by arrows 204 and 205. Arrow 204 represents the secondary at position A operating at 20 kHz (in the position at which it was tuned) and the frequency at position B is indicated by arrow 205 being 20.64 kHz. The change in frequency of the secondary is represented by $\Delta\omega_2$.

Referring to FIG. 19, the performance of a system tuned at the BB position with a series tuned pick-up is shown. Arrow 206 shows the expected operating frequency of the primary at position A based on inductance measurements when the system is non-operational. Arrow 207 shows the operating frequency of the primary at position B which is 20 kHz as expected. The actual variation in frequency is quite different and is explained by the fact that both the reactance of the primary and secondary networks are changing and the coupling between the networks is changing, as described above. As can be seen, arrow 208 represents the actual natural resonant frequency of the primary during operation at position A. As the secondary is moved to position B, the frequency decreases to a minimum of 19.87 kHz shown by broken line 209, and rises again to the tuned frequency of 20 kHz when the secondary is moved to position B. The natural resonant frequency of the secondary during operation at position A is shown by arrow 201, moving to the tuned frequency at position B as shown by arrow 211.

Considering the series tuned secondary example of FIGS. 18 and 19, this system tuned at AA has a much larger variation in $\omega_1$ compared with the system BB. The secondary tuning variations are similar but shifted either positive or negative. If the tuning is changed to that of FIG. 20, where the secondary is tuned at position B and the primary at position A then the variation in $\omega_1$ can be kept small, but now it is shifted further away from the operating frequency, which is also undesirable. In FIG. 20, the expected frequencies for the primary based on inductance measurements are shown by arrows 212 and 213 for positions A and B respectively. The actual natural resonant frequencies during operation are shown by arrows 214 and 215. Again, the frequency decreases to a minimum of 20.69 kHz at a location between points A and B. The actual frequency shift for the secondary is shown by arrows 215 and 216 relating to positions A and B respectively.

Using the new design approach described within this specification, the resulting tuning frequency shifts can be both minimized and positioned close to, but just above, wo as desired to ensure the supply sees a resistive inductive load for the power supply described earlier. This is shown in FIG. 21 in which the frequencies for the primary determined from inductance measurement are show by arrows 217 and 218, and those for the actual natural resonant frequencies during operation are shown by arrows 219 and 220. The frequency variation for the secondary is shown by arrows 221 and 222. In this design the natural resonant operating frequencies have been selected to constrain the variation in reactive load and thus constrain the variation in frequency for the given change in reactance (brought about by the changes in relative position of the primary and secondary).

FIGS. 22 and 23 show the variations in tuned frequency of both the primary and secondary operation under the design options of BB and the desired approach explained here when a parallel tuned secondary pad is used. Again there are significant shifts in $\omega_1$ in FIG. 22, whereas FIG. 23 under the new design approach shows that the frequency shift can be contained and kept inductive for the supply. The arrows representing the frequencies at position A and 13 have the same reference numerals as those for the series tuned situation described with reference to FIGS. 18, 19 and 21.

If the pick-up resonant network is designed only to minimize its $VA_2$, then the design approach is slightly different as discussed below.

The design, shown in FIG. 24 (referring to the design approaches discussed earlier in the specification), determines the extent of the variation of $\omega_2$ and optimizes the tuning of the secondary so that $\omega_0$ is approximately in the centre of $\Delta\omega_2$ in order to minimize $VA_2$. Thus, as shown in FIG. 24, the frequency of the secondary at position A is shown by arrow 230, and at position B by arrow 231. After fixing the secondary tuning, the primary tuning is adjusted to minimize the spread of $\Delta\omega_1$ around $\omega_0$, In this process the variation between $\omega_1$ and $\omega_2$ ($\Delta\omega_{12}$) is also constrained in order to minimise $VA_1$, thereby ensuring the primary resonant network input PF variation is minimized and maintained as close to unity as possible. $\Delta\omega_{12}$ indicates the amount of additional reactive power required due to mistuning. Thus in this design the invention has been used to select the frequencies so that the variation or sweep is itself constrained to be near to, or spread about, the operating frequency of the system i.e. $\omega_0$, and the difference between the primary and secondary natural resonant frequencies during operation has also been constrained.

If a secondary resonant network is tuned in such a way so that it assists in the minimization of $VA_1$, without thought for $VA_2$ then the design shown in FIG. 25 results. Case 1 and case 3 in FIGS. 24 and 25 show results expected from measured inductance rather than the resonant frequency during operation which is shown in cases 2 and 4.

Here $\Delta\omega_2$ and $\Delta\omega_1$ are placed around $\omega_0$ while also minimizing the overall $\Delta\omega_{12}$ variation at all possible physical positions of the magnetics apparatus in order to minimise $VA_1$. Consequently the primary resonant network input PF variation is minimized while maintaining it as close to unity as possible. The Secondary tuning variation is no longer centered (or nearly centered) around $\omega_0$.

The invention claimed is:

1. A wireless power transfer primary resonant network including:
   a primary winding capable of being energised to provide a magnetic field; and
   at least one reactive tuning component selected to constrain a reactive loading on a power supply which energises the primary resonant network, the reactive tuning component being selected dependent on a given variation in inductance or capacitance of the primary resonant network and a given variation in inductance or capacitance of a secondary resonant network to be coupled to the primary resonant network, and wherein an input impedance to the primary resonant network is inductive.

2. The wireless power transfer primary resonant network as claimed in claim 1 wherein the reactive tuning component is selected dependent on a given variation in coupling between the primary and secondary resonant networks.

3. The wireless power transfer primary resonant network as claimed in claim 2 wherein the given variation in coupling is caused by relative movement of a pick-up winding of the secondary resonant network relative to the primary winding.

4. The wireless power transfer primary resonant network as claimed in claim 1 wherein the reactive tuning component is selected to constrain a variation in reactive loading on the power supply.

5. The wireless power transfer primary resonant network as claimed in claim 1 wherein the reactive tuning component is selected to constrain power factor.

6. The wireless power transfer primary resonant network as claimed in claim 1 wherein the reactive tuning component comprises the primary winding.

7. The wireless power transfer primary resonant network as claimed in claim 1 wherein the given variation in inductance or capacitance is caused by relative movement or displacement of a pick-up winding of the secondary resonant network relative to the primary winding.

8. A wireless power transfer secondary resonant network including:
   a pick-up winding capable of receiving energy from a varying magnetic field produced by a primary resonant network; and
   at least one reactive tuning component selected to constrain a reactive loading on a power supply which energises the primary resonant network, the reactive tuning component being selected dependent on a given variation in inductance or capacitance of the secondary resonant network and a given variation in inductance or capacitance of the primary resonant network to which the secondary resonant network is to be coupled, and wherein an input impedance to the primary resonant network is inductive.

9. The wireless power transfer secondary resonant network as claimed in claim 8 wherein the reactive tuning component is selected dependent on a given variation in coupling between the primary and secondary resonant networks.

10. The wireless power transfer secondary resonant network as claimed in claim 8 wherein the reactive tuning component is selected to constrain a variation in reactive loading on the power supply.

11. The wireless power transfer secondary resonant network as claimed in claim 8 wherein the reactive tuning component is selected to constrain power factor.

12. The wireless power transfer secondary resonant network as claimed in claim 8 wherein the reactive tuning component comprises the pick-up winding.

13. The wireless power transfer secondary resonant network as claimed in claim 8 wherein the given variation in inductance or capacitance is caused by relative movement or displacement of the pick-up winding relative to a primary winding of the primary resonant network.

14. The wireless power transfer secondary resonant network as claimed in claim 8 wherein the given variation in coupling is caused by relative movement of the pick-up winding relative to a primary winding of the primary resonant network.

15. An apparatus for wireless power transfer including:
   a primary resonant network, and
   a secondary resonant network coupled to the primary resonant network,
   wherein the apparatus has a system operating frequency and one or both of the primary resonant network and the secondary resonant network have a natural resonant frequency that is different from the system operating frequency, and wherein the natural resonant frequency of the primary resonant network is selected dependent on a given variation in inductance or capacitance of the primary resonant network and a given variation in inductance or capacitance of the secondary resonant network, and wherein the input impedance to the primary resonant network is inductive.

16. The apparatus as claimed in claim 15 wherein the natural resonant frequency of the primary resonant network is selected dependent on a given variation in coupling between the primary and secondary resonant networks.

17. The apparatus as claimed in claim 15 wherein the natural resonant operating frequency of the primary resonant network is selected to constrain a variation in the operating frequency of the primary resonant network.

18. The apparatus as claimed in claim 15 comprising a wireless power transfer charger.

19. A method of designing a wireless power transfer primary resonant network having a primary winding capable of being energised to provide a magnetic field, the method comprising:
   selecting at least one reactive tuning component selected to constrain the reactive loading on a power supply which energises the primary resonant network, the reactive tuning component being selected dependent on a given variation in inductance or capacitance of the primary resonant network and a given variation in inductance or capacitance of a secondary resonant network to be coupled to the primary resonant network,
   wherein the input impedance to the primary resonant network is inductive.

* * * * *